(12) United States Patent
Masuta et al.

(10) Patent No.: US 12,373,974 B2
(45) Date of Patent: Jul. 29, 2025

(54) SHAPE MEASUREMENT DEVICE AND METHOD FOR CONTROLLING SAME

(71) Applicant: Tokyo Seimitsu Co., Ltd., Tokyo (JP)

(72) Inventors: Hikaru Masuta, Tsuchiura (JP); Hideki Morii, Tsuchiura (JP)

(73) Assignee: TOKYO SEIMITSU CO., LTD., Tokyo (JP)

( * ) Notice: Subject to any disclaimer, the term of this patent is extended or adjusted under 35 U.S.C. 154(b) by 455 days.

(21) Appl. No.: 17/985,006

(22) Filed: Nov. 10, 2022

(65) Prior Publication Data

US 2023/0064860 A1    Mar. 2, 2023

Related U.S. Application Data

(63) Continuation of application No. PCT/JP2021/016938, filed on Apr. 28, 2021.

(30) Foreign Application Priority Data

May 14, 2020    (JP) .................................. 2020-085357

(51) Int. Cl.
   *G01B 5/28*       (2006.01)
   *G01B 11/25*      (2006.01)
   (Continued)

(52) U.S. Cl.
   CPC ............ *G06T 7/62* (2017.01); *G01B 11/2522* (2013.01); *G06T 7/0008* (2013.01); *G06T 2207/30168* (2013.01)

(58) Field of Classification Search
   CPC .. G06T 7/62; G01B 5/28; G01B 11/30; G01B 11/2522

(Continued)

(56) References Cited

U.S. PATENT DOCUMENTS 7,918,036 B2 *   4/2011  Ishikawa ................. G01B 5/20
                                                        33/503
9,074,865 B2 *   7/2015  Yamauchi .............. G01B 21/30
(Continued)

FOREIGN PATENT DOCUMENTS

JP    2007-290111 A    11/2007
JP    2014-109495 A     6/2014
(Continued)

OTHER PUBLICATIONS

Japanese Office Action for counterpart Japanese Application No. 2023-167824, dated Oct. 2, 2024, with English translation.

(Continued)

*Primary Examiner* — George B Bennett
(74) *Attorney, Agent, or Firm* — Birch, Stewart, Kolasch & Birch, LLP

(57) ABSTRACT

A shape measurement device includes: a displacement detector configured to detect displacement of a contact; a relative movement mechanism configured to relatively move the displacement detector with respect to the measurement object, and allow the contact to trace a surface to be measured of the measurement object; a position detecting sensor configured to detect a relative position of the displacement detector with respect to the measurement object; a camera configured to image the contact, and output a captured image of the contact; and a synchronization controller configured to repetitively execute three actions in synchronization together while the relative movement is being performed by the relative movement mechanism, the actions including detection of the relative position by the position detecting sensor, detection of the displacement by the displacement detector, and imaging by the camera.

17 Claims, 22 Drawing Sheets

(51) Int. Cl.
G06T 7/00 (2017.01)
G06T 7/62 (2017.01)

(58) Field of Classification Search
USPC .................................. 33/533, 551, 553, 554
See application file for complete search history.

(56) References Cited

U.S. PATENT DOCUMENTS

| | | | | |
|---|---|---|---|---|
| 9,151,589 | B2* | 10/2015 | Kanematsu | G01B 21/30 |
| 9,285,201 | B2* | 3/2016 | Matsumiya | G01B 7/28 |
| 9,291,442 | B2* | 3/2016 | Hidaka | G01B 21/30 |
| 10,571,238 | B2* | 2/2020 | Morii | G01B 3/008 |
| 11,022,418 | B2* | 6/2021 | Kanematsu | G01B 5/0004 |
| 11,255,653 | B2* | 2/2022 | Leber | G01B 5/20 |
| 11,454,487 | B2* | 9/2022 | Schwarzer | G01B 5/20 |
| 11,859,969 | B2* | 1/2024 | Morii | G01B 3/004 |
| 11,940,463 | B2* | 3/2024 | Hayashi | G01B 11/24 |
| 12,014,485 | B1* | 6/2024 | Klippstein | G01B 11/24 |
| 2007/0232203 | A1 | 10/2007 | Fukuda et al. | |
| 2014/0331511 | A1* | 11/2014 | Yamauchi | G01B 5/28 33/558 |
| 2019/0242702 | A1* | 8/2019 | Singh | G01B 11/005 |
| 2021/0033392 | A1* | 2/2021 | Omori | G01B 21/042 |
| 2024/0353214 | A1* | 10/2024 | Rubin | G01R 19/10 |

FOREIGN PATENT DOCUMENTS

| | | |
|---|---|---|
| JP | 2017-161548 A | 9/2017 |
| JP | 2018-72267 A | 5/2018 |
| JP | 2020-197436 A | 12/2020 |

OTHER PUBLICATIONS

International Search Report for PCT/JP2021/016938 (PCT/ISA/210) mailed on Jul. 27, 2021.
Written Opinion of the International Searching Authority for PCT/JP2021/016938 (PCT/ISA/237) mailed on Jul. 27, 2021.

* cited by examiner

SHAPE MEASUREMENT DEVICE AND METHOD FOR CONTROLLING SAME

CROSS-REFERENCE TO RELATED APPLICATIONS

The present application is a Continuation of PCT International Application No. PCT/JP2021/016938 filed on Apr. 28, 2021 claiming priority under 35 U.S.C § 119(a) to Japanese Patent Application No. 2020-085357 filed on May 14, 2020. Each of the above applications is hereby expressly incorporated by reference, in their entirety, into the present application.

BACKGROUND OF THE INVENTION

Field of the Invention

The presently disclosed subject matter relates to a shape measurement device that performs shape measurement of a measurement object by using a contact, and a method for controlling the same.

Description of the Related Art

A surface shape measurement device (shape measurement device) that measures a surface shape, such as a contour shape and surface roughness, of a surface of a workpiece (object to be measured) has been known. Relatively moving a contact and the workpiece in the horizontal direction while the contact is in contact with the surface of the workpiece, such a surface shape measurement device allows the contact to trace the surface of the workpiece while using a displacement detector to detect the displacement caused by the swing of the contact, and measures the surface shape of the surface of the workpiece based on a displacement detection signal output from the displacement detector (see PTL 1).

Citation List

PTL 1: Japanese Patent Application Laid-Open No. 2017-161548

SUMMARY OF THE INVENTION

When the surface shape of the workpiece is measured by using the surface shape measurement device, an abnormal waveform may occur in the displacement detection signal output from the displacement detector. In this case, it is difficult to determine whether the abnormal waveform is caused by the actual shape of the surface of the workpiece or caused by an external environmental factor (e.g., dust or the like adhering to the surface of the workpiece).

Accordingly, it is conceivable to increase a measurement force of the surface shape measurement device (pressing force at which the contact is pressed against the workpiece) so that a measurement result is less affected by a foreign matter adhering to the surface of the workpiece. However, an increased measurement force may cause a deformation of the workpiece or make a scratch on the surface of the workpiece.

An object of the presently disclosed subject matter, which has been made in view of such situations, is to provide a shape measurement device capable of easily detect the cause of abnormality in shape measurement of a measurement object, and a method of controlling the same.

A shape measurement device for achieving the object of the presently disclosed subject matter is a shape measurement device for shape measurement of a measurement object by using a contact that is brought into contact with the measurement object, including: a displacement detector configured to detect displacement of the contact; a relative movement mechanism configured to relatively move the displacement detector with respect to the measurement object, and allow the contact to trace a surface to be measured of the measurement object; a position detecting sensor configured to detect a relative position of the displacement detector with respect to the measurement object; a camera configured to image the contact, and output a captured image of the contact; and a synchronization controller configured to repetitively execute three actions in synchronization together while the relative movement is being performed by the relative movement mechanism, the actions including detection of the relative position by the position detecting sensor, detection of the displacement by the displacement detector, and imaging by the camera.

According to the shape measurement device, the three actions are repetitively executed in synchronization together, thereby allowing an operator to verify the captured image obtained at timing synchronized with the relative position with respect to each relative position of the displacement detector. That is, the operator can verify the captured image corresponding to any relative position.

In the shape measurement device according to another aspect of the presently disclosed subject matter, the synchronization controller outputs a synchronization signal for synchronizing the three actions, to the position detecting sensor, the displacement detector and the camera. Accordingly, the three actions described above can be repetitively executed in synchronization together.

The shape measurement device according to another aspect of the presently disclosed subject matter further includes a storage controller configured to store the relative position detected by the position detecting sensor, the displacement of the contact detected by the displacement detector, and the captured image taken by the camera, in an associated manner, in a storage unit, every time the three actions are executed in synchronization together. Accordingly, for each relative position of the displacement detector, the captured image obtained at timing synchronized with the relative position can be verified by the operator.

The shape measurement device according to another aspect of the presently disclosed subject matter further includes: a signal generator configured to generate a displacement detection signal indicating the displacement of the contact at each relative position; a display controller configured to cause a monitor to display the displacement detection signal generated by the signal generator; and an operation unit configured to accept a designation operation of designating any designated position in the displacement detection signal displayed on the monitor, wherein the display controller obtains, from the storage unit, the captured image corresponding to the designated position designated by the designation operation to the operation unit, and causes the monitor to display the captured image. Accordingly, the operator can verify a captured image corresponding to a desired designated position.

In the shape measurement device according to another aspect of the presently disclosed subject matter, every time the designated position is changed, the display controller repetitively executes obtainment of the captured image from the storage unit, and displaying of the captured image on the monitor. Accordingly, the operator can verify a captured image corresponding to a desired designated position. When an abnormal waveform occurs in the displacement detection signal, the captured images taken before and after the occurrence can be verified, which can easily detect the cause of the abnormal waveform.

The shape measurement device according to another aspect of the presently disclosed subject matter further includes a low-pass filter configured to apply low-pass filtering to the displacement detection signal generated by the signal generator, wherein the display controller has a superimposed display mode for causing the monitor to display the displacement detection signals before and after the low-pass filtering. Accordingly, a false shape caused by an external environmental factor, such as a foreign matter, can be highly accurately removed from a measurement result of shape measurement, which can further improve the reliability and accuracy of the measurement result.

The shape measurement device according to another aspect of the presently disclosed subject matter further includes: a signal generator configured to generate a displacement detection signal indicating the displacement of the contact at each relative position; an abnormal waveform detector configured to detect an abnormal waveform where a waveform of the displacement detection signal is abnormal, from the displacement detection signal generated by the signal generator; and a first abnormality determining unit configured to determine presence or absence of abnormality in the shape measurement, based on the captured image that is in the storage unit and corresponds to a first range, the first range being assumed as a range of the relative position where the abnormal waveform is detected by the abnormal waveform detector. Accordingly, presence or absence of abnormality in the shape measurement can be automatically determined.

In the shape measurement device according to another aspect of the presently disclosed subject matter, the first abnormality determining unit determines presence or absence of abnormality in the shape measurement, based on presence or absence of an image of a foreign matter in the captured image. Accordingly, presence or absence of abnormality in the shape measurement can be automatically determined.

The shape measurement device according to another aspect of the presently disclosed subject matter further includes a remeasurement controller configured to execute remeasurement that drives the relative movement mechanism and retraces the surface to be measured by the contact, wherein every time the first abnormality determining unit determines that abnormality is present, the remeasurement controller executes the remeasurement, and the signal generator generates the displacement detection signal, and the abnormal waveform detector detects the abnormal waveform, and the first abnormality determining unit determines presence or absence of abnormality in the shape measurement. Accordingly, in case abnormality in the shape measurement occurs, the remeasurement can be executed, which can more correctly determine whether the abnormality is caused by the actual shape of the surface to be measured, or caused by an external environmental factor (foreign matter or the like).

The shape measurement device according to another aspect of the presently disclosed subject matter further includes a notification unit configured to issue a notification about warning information when a number of remeasurements exceeds a predetermined certain number. Accordingly, the operator can recognize occurrence of abnormality, and quickly execute verification of the occurrence factor of the abnormality.

In the shape measurement device according to another aspect of the presently disclosed subject matter, the storage controller temporarily stores, in a buffer memory of the storage unit, data that includes the relative position detected by the position detecting sensor, the displacement of the contact detected by the displacement detector and the captured image taken by the camera, and stores, in a data storage of the storage unit, data determined to be abnormal by the first abnormality determining unit in the data temporarily stored in the buffer memory.

The shape measurement device according to another aspect of the presently disclosed subject matter further includes a second abnormality determining unit configured to determine presence or absence of abnormality in the shape measurement, in each captured image stored in the storage unit. Accordingly, presence or absence of abnormality in the shape measurement can be automatically determined.

In the shape measurement device according to another aspect of the presently disclosed subject matter, the second abnormality determining unit determines presence or absence of abnormality in the shape measurement, based on presence or absence of an image of a foreign matter in the captured image, with respect to each captured image stored in the storage unit. Accordingly, presence or absence of abnormality in the shape measurement can be automatically determined.

The shape measurement device according to another aspect of the presently disclosed subject matter further includes: a signal generator configured to generate a displacement detection signal indicating the displacement of the contact at each relative position; and a display controller configured to cause a monitor to display the displacement detection signal generated by the signal generator, wherein the display controller refers to the storage unit and detects a second range that is a range of the relative position corresponding to the captured image determined to be abnormal by the second abnormality determining unit, and causes the monitor to identifiably display a waveform region corresponding to the second range in the waveform of the displacement detection signal displayed on the monitor. Accordingly, the operator can be notified of the position and range of the second range where abnormality in the shape measurement occurs.

The shape measurement device according to another aspect of the presently disclosed subject matter further includes a notification unit configured to issue a notification about warning information when the second abnormality determining unit determines that abnormality is present. Accordingly, the operator can recognize occurrence of abnormality, and quickly execute verification of the occurrence factor of the abnormality.

In the shape measurement device according to another aspect of the presently disclosed subject matter, the storage controller temporarily stores, in a buffer memory of the storage unit, data that includes the relative position detected by the position detecting sensor, the displacement of the contact detected by the displacement detector and the captured image taken by the camera, and stores, in a data storage of the storage unit, data determined to be abnormal by the second abnormality determining unit in the data temporarily stored in the buffer memory.

In the shape measurement device according to another aspect of the presently disclosed subject matter, the relative movement mechanism relatively moves the displacement detector in a horizontal direction with respect to the measurement object.

In the shape measurement device according to another aspect of the presently disclosed subject matter, the relative movement mechanism relatively rotates the measurement object and the displacement detector about a rotation center while the contact is in contact with a peripheral surface of the measurement object that has a solid cylindrical shape or a hollow cylindrical shape.

A method of controlling a shape measurement device for achieving the object of the presently disclosed subject matter is a method of controlling a shape measurement device that comprises a displacement detector including a contact in contact with a measurement object, and a relative movement mechanism configured to relatively move the displacement detector with respect to the measurement object, and allow the contact to trace a surface to be measured of the measurement object, and performs shape measurement of the measurement object by using the contact, the method including: a position detecting step of detecting a relative position of the displacement detector with respect to the measurement object; a displacement detecting step of detecting a displacement of the contact by the displacement detector; an imaging step of imaging the contact, and outputting a captured image of the contact; and a synchronization control step of repetitively executing three actions in synchronization together while the relative movement is being performed by the relative movement mechanism, the actions including detection of the relative position in the position detecting step, detection of the displacement in the displacement detecting step, and imaging in the imaging step.

The presently disclosed subject matter can easily detect the cause of abnormality in shape measurement of a measurement object.

DESCRIPTION OF THE EMBODIMENTS

First Embodiment

Figure 1:
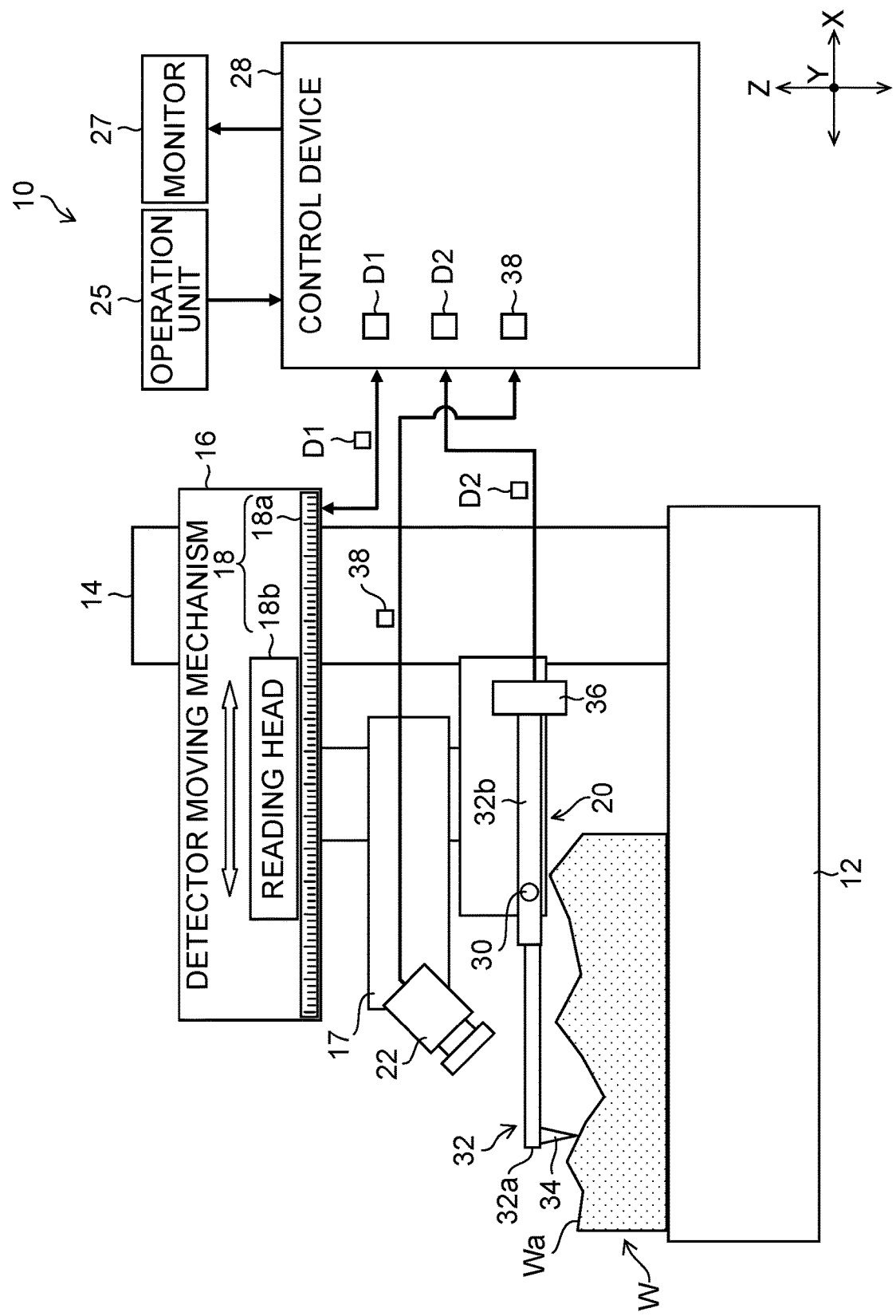
FIG. 1 schematically illustrates a surface shape measurement device according to a first embodiment.

FIG. 1 schematically illustrates a surface shape measurement device 10 according to a first embodiment corresponding to a shape measurement device of the presently disclosed subject matter. As illustrated in FIG. 1, the surface shape measurement device 10 measures the shape of a surface Wa of a workpiece W, specifically, measures the contour shape, the surface roughness or the like. Here, the workpiece W corresponds to a measurement object of the presently disclosed subject matter, and the surface Wa corresponds to a surface to be measured of the presently disclosed subject matter. The XY plane including the XY directions among XYZ directions orthogonal to each other in the diagram is a plane in parallel with a horizontal direction, and the Z direction is a vertical direction perpendicular to the horizontal direction.

The surface shape measurement device 10 includes a plate-shaped measurement stage 12, a column 14, a detector moving mechanism 16, a position detecting sensor 18, a displacement detector 20, a camera 22, an operation unit 25, a monitor 27 and a control device 28.

The workpiece W is set on an upper surface of the measurement stage 12; the upper surface is in parallel with the XY plane of the measurement stage 12. The column 14 that extends in the Z direction is provided on the upper surface of the measurement stage 12. The detector moving mechanism 16 is attached to the column 14 freely movably in the Z direction.

The detector moving mechanism 16 corresponds to a relative movement mechanism of the presently disclosed subject matter, and is a publicly known actuator that holds a holder 17 freely movably in the X direction. By driving the detector moving mechanism 16, the displacement detector 20 (contact 34) can be relatively moved in the X direction with respect to the workpiece W. The detector moving mechanism 16 is provided with the position detecting sensor 18.

The position detecting sensor 18 includes, for example: a linear scale 18a that extends in the X direction (lateral direction); and a reading head 18b that reads the linear scale 18a by any of various methods, such as an optical method or a magnetic method. The position detecting sensor 18 detects the X-direction displacement (the displacement direction and the amount of displacement) of the holder 17 moved in the X direction by the detector moving mechanism 16, thereby detecting the X-direction position of the displacement detector 20 described later, i.e., the relative position of the displacement detector 20 in the X direction with respect to the workpiece W. The position detecting sensor 18 then outputs an X-direction position detection result D1 of the displacement detector 20, to the control device 28. A publicly known detector other than a scale-type detector may be adopted as the position detecting sensor 18.

The holder 17 is provided with the displacement detector 20 and the camera 22. Accordingly, the displacement detector 20 is held by the detector moving mechanism 16 via the holder 17 freely movably in the X direction. The displacement detector 20 is held by the column 14 via the holder 17 and the detector moving mechanism 16 position-adjustably in the Z direction.

The displacement detector 20 includes a swing pivot 30, an arm 32, a contact 34, and a displacement detecting sensor 36.

The swing pivot 30 supports the arm 32 freely swingably about the rotation axis (swing axis) in parallel with the Y direction.

The arm 32 is supported freely swingably at the swing pivot 30, and includes an arm distal end portion 32a that extends in one sense of the X direction (opposite to the column 14), and an arm proximal end portion 32b that extends in the other sense of the X direction.

On the distal end side of the arm distal end portion 32a, the contact 34 (also called a stylus or a measurement piece) is provided. The contact 34 comes into contact with the surface Wa. The arm 32 swings centered at the swing pivot 30, thereby allowing the contact 34 to be displaced in the Z direction. The displacement detector 20 is moved by the detector moving mechanism 16 in the X direction, thereby allowing the contact 34 to trace (scan) the surface Wa along the X direction.

The arm proximal end portion 32b is urged upward in the Z direction by an urging member, not illustrated. Accordingly, the arm distal end portion 32a and the contact 34 are urged downward in the Z direction centered at the swing pivot 30. Accordingly, the contact 34 is maintained in contact with the surface Wa.

For example, a linear variable differential transformer (LVDT) is adopted as the displacement detecting sensor 36. In this case, although not illustrated, the displacement detecting sensor 36 includes a core provided at the arm proximal end portion 32b, and a coil into which the core is inserted. The displacement detecting sensor 36 detects the displacement in the Z direction (the displacement direction and the amount of displacement) due to the swings of the arm 32 and the contact 34, and outputs a displacement detection result D2 that is a detection result of the displacement, to the control device 28. A publicly known sensor (e.g., a scale-type sensor) other than the LVDT may be adopted as the displacement detecting sensor 36.

The camera 22 is provided at the holder 17, sequentially images (takes a moving image of) the distal end portion of the contact 34, and consecutively outputs a captured image 38 of (image data on) the contact 34 to the control device 28. Based on the captured image 38, presence or absence of adhesion of a foreign matter 59 (see FIG. 4), such as dust, onto the surface Wa can be verified, and the actual shape of the surface Wa can be verified.

For example, a keyboard, a mouse, an operation panel, operation buttons or the like is used as the operation unit 25, which accepts input of various operations by an operator.

Any of various displays, such as a publicly known liquid crystal display, may be adopted as the monitor 27. The monitor 27 displays an after-mentioned displacement detection signal D3 (see FIG. 2) that is a result of measuring the shape of the surface Wa by the surface shape measurement device 10, the captured image 38 by the camera 22, various setting screens, various operation screens and the like.

The control device 28 includes a computation circuit made up of various processors, memories and the like. The various processors include a CPU (Central Processing Unit), a GPU (Graphics Processing Unit), an ASIC (Application Specific Integrated Circuit), and a programmable logic device (e.g., SPLD (Simple Programmable Logic Devices), CPLD (Complex Programmable Logic Device) and FPGA (Field Programmable Gate Arrays)). Various functions of the control device 28 may be achieved by one processor, or achieved by the same type or different types of processors.

Figure 2:
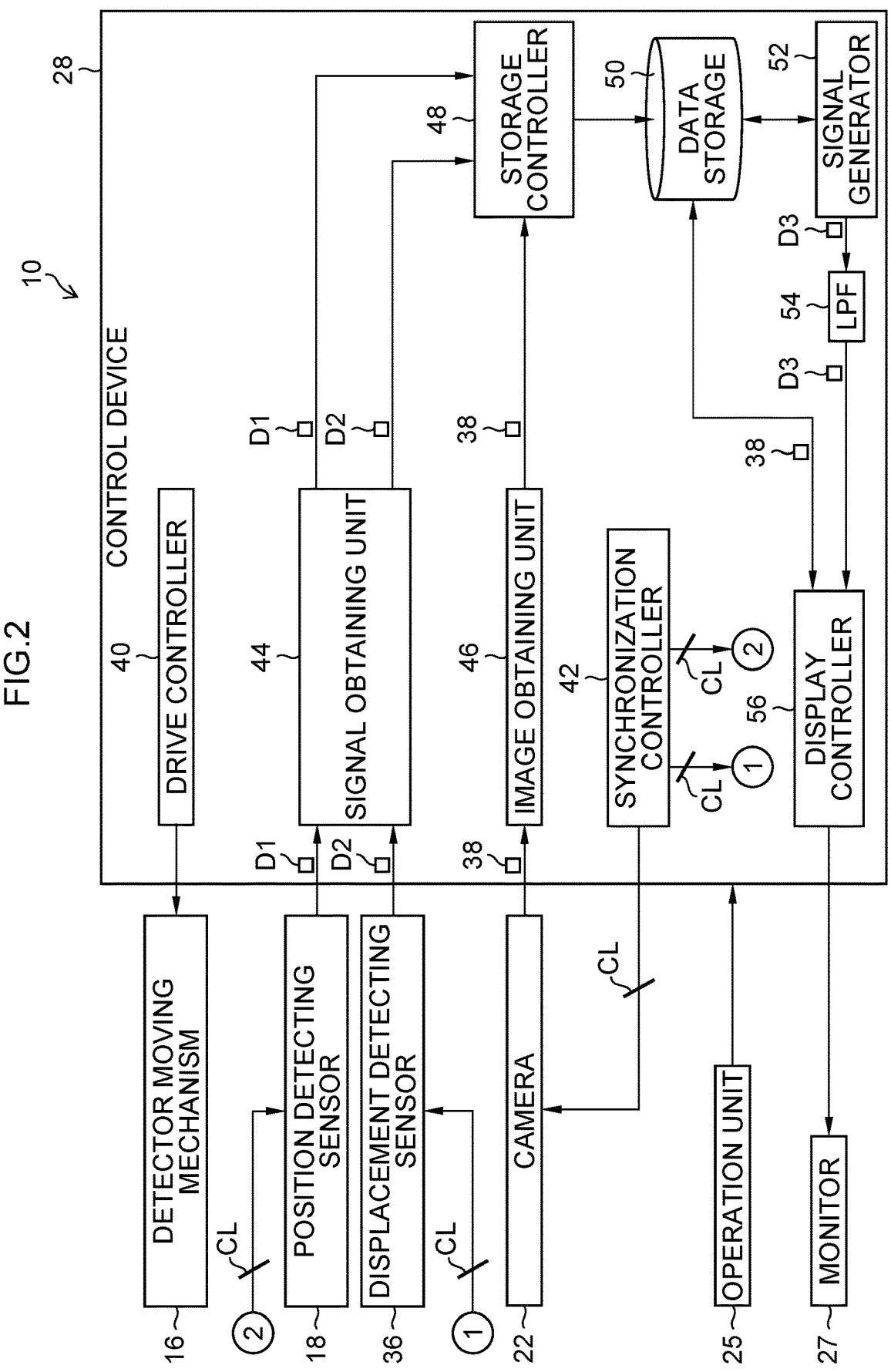
FIG. 2 is a block diagram illustrating a configuration of a control device according to the first embodiment.

FIG. 2 is a block diagram illustrating the configuration of the control device 28 according to the first embodiment. As illustrated in FIG. 2, the detector moving mechanism 16, the position detecting sensor 18, the displacement detecting sensor 36 of the displacement detector 20, the camera 22, the operation unit 25, the monitor 27 and the like, which are described above, are connected to the control device 28, and the control device 28 integrally controls the operation of each unit of the surface shape measurement device 10. The control device 28 synchronizes detection by the position detecting sensor 18, detection by the displacement detecting sensor 36, and imaging by the camera 22 together. Furthermore, every time the detection and imaging described above are executed, the control device 28 causes a data storage 50 to store the X-direction position detection result D1 of the displacement detector 20 detected by the position detecting sensor 18, the displacement detection result D2 of the contact 34 detected by the displacement detecting sensor 36, and the captured image 38 taken by the camera 22, in an associated manner.

The control device 28 includes a drive controller 40, a synchronization controller 42, a signal obtaining unit 44, an image obtaining unit 46, a storage controller 48, the data storage 50, a signal generator 52, a low-pass filter 54 (LPF) and a display controller 56.

The drive controller 40 controls driving of the detector moving mechanism 16. In response to input of a measurement start operation into the operation unit 25, the drive controller 40 drives the detector moving mechanism 16 and moves the displacement detector 20 and the like in the X direction. Accordingly, the surface Wa is traced along the X direction by the contact 34. And, shape measurement of the surface Wa is executed.

During execution of movement of the displacement detector 20 in the X direction by the detector moving mechanism 16, that is, during shape measurement of the surface Wa by the surface shape measurement device 10 (hereinafter abbreviated as "during surface shape measurement"), the synchronization controller 42 outputs a synchronization signal CL to the position detecting sensor 18, the displacement detecting sensor 36 and the camera 22. The synchronization signal CL is a signal for synchronizing detection by the position detecting sensor 18, detection by the displacement detecting sensor 36, and imaging by the camera 22 together. For example, a clock signal is adopted as the synchronization signal CL. Accordingly, during surface shape measurement, three actions that include detection of the X-direction position of the displacement detector 20 by the position detecting sensor 18, detection of the displacement of the contact 34 by the displacement detecting sensor 36, and imaging of the contact 34 by the camera 22 (hereinafter simply abbreviated as "three actions") are repetitively executed in synchronization together according to the synchronization signal CL.

The signal obtaining unit 44 is a connection interface connected to the position detecting sensor 18 and the displacement detecting sensor 36. During surface shape measurement, the signal obtaining unit 44 executes obtainment of the X-direction position detection result D1 of the displacement detector 20 from the position detecting sensor 18, and outputting of the X-direction position detection result D1 to the storage controller 48, and executes obtainment of the displacement detection result D2 of the contact 34 from the displacement detecting sensor 36, and outputting of the displacement detection result D2 to the storage controller 48.

The image obtaining unit 46 is a connection interface connected to the camera 22. During surface shape measurement, the image obtaining unit 46 repetitively executes obtainment of the captured image 38 from the camera 22, and outputting of the captured image 38 to the storage controller 48.

Figure 3:
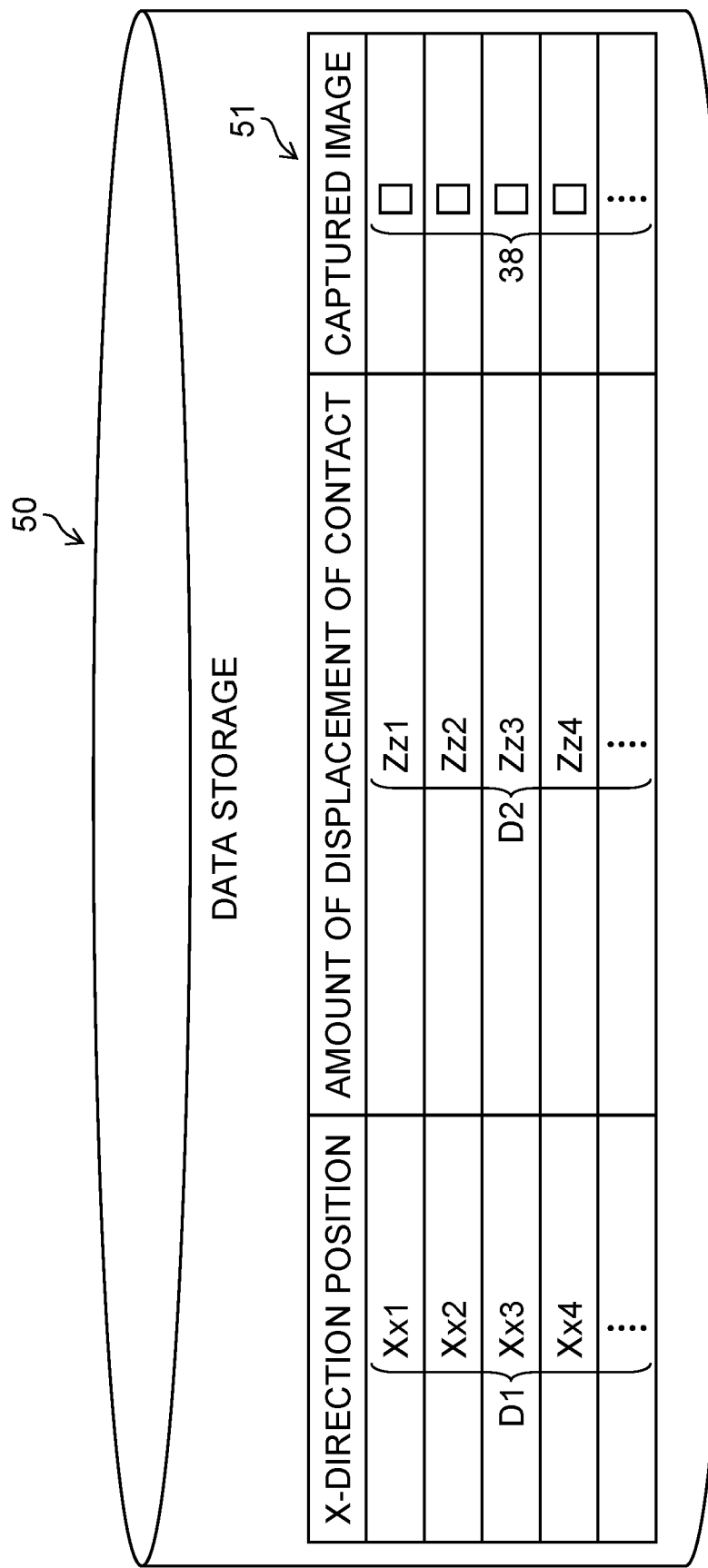
FIG. 3 schematically illustrates saved data stored in a data storage by a storage controller.

FIG. 3 schematically illustrates saved data 51 stored in the data storage 50 by the storage controller 48. As illustrated in FIG. 3 and the aforementioned FIG. 2, the data storage 50 corresponds to a storage unit of the presently disclosed subject matter, and is any of publicly known various storage media (a memory, a storage, etc.) capable of persistently ("temporarily" is also allowed) storing data.

During surface shape measurement, the storage controller 48 stores the saved data 51 in the data storage 50. During surface shape measurement, the saved data 51 is data obtained by continuously storing, in an associated manner, the X-direction position detection result D1, the displacement detection result D2, and the captured image 38 obtained by the three actions synchronized with the synchronization signal CL.

Specifically, every time the three actions are executed in synchronization with the synchronization signal CL, the storage controller 48 causes the data storage 50 to store the X-direction position detection result D1 and the displacement detection result D2 input from the position detecting sensor 18 and the displacement detecting sensor 36 via the signal obtaining unit 44, and the captured image 38 input from the camera 22 via the image obtaining unit 46, in an associated manner. Accordingly, every time the three actions are executed, the X-direction position detection result D1, the displacement detection result D2, and the captured image 38 are repetitively stored in the data storage 50 in the state of being associated together.

Returning to FIG. 2, the signal generator 52 refers to the saved data 51 in the data storage 50, generates the displacement of the contact 34 in the Z direction with respect to each X-direction position of the displacement detector 20 (contact 34), i.e., the displacement detection signal D3 indicating the surface shape of the surface Wa, and outputs the displacement detection signal D3 to the low-pass filter 54. The signal generator 52 may generate the displacement detection signal D3 by directly and continuously obtaining the X-direction position detection result D1 and the displacement detection result D2 from the signal obtaining unit 44 during surface shape measurement, and output this signal to the low-pass filter 54.

The low-pass filter 54 applies low-pass filtering to the displacement detection signal D3 output from the signal generator 52, based on a preset cutoff value, and removes high-frequency noise from the displacement detection signal D3. The displacement detection signal D3 output from the low-pass filter 54 is input into the display controller 56.

The display controller 56 causes the monitor 27 to display the displacement detection signal D3 input from the low-pass filter 54. In response to input of an after-mentioned designation operation into the operation unit 25, the display controller 56 causes the monitor 27 to display the captured image 38 corresponding to the designation operation.

Figure 4:
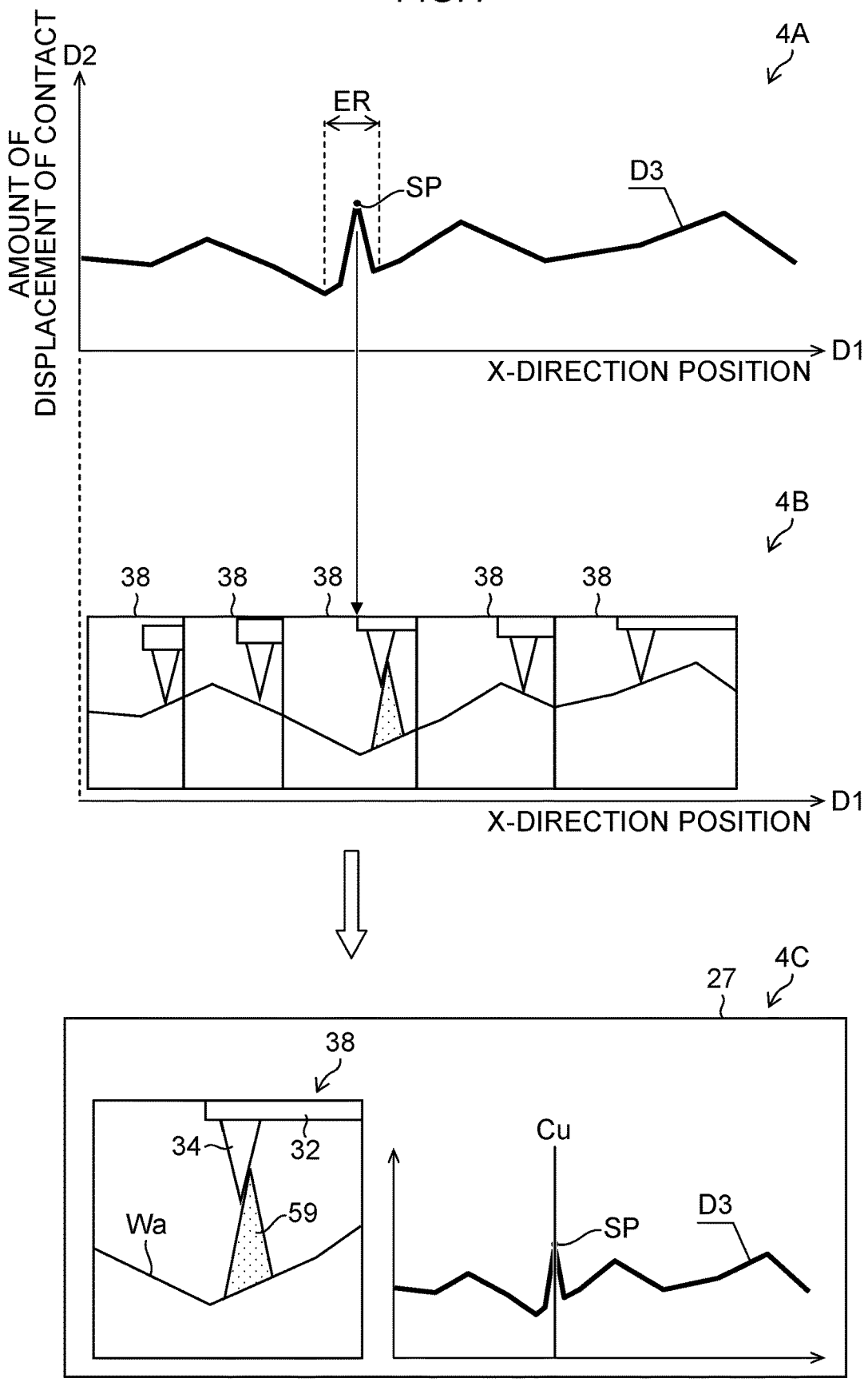
FIG. 4 is a diagram for illustrating displaying of a captured image on a monitor in response to a designation operation.

FIG. 4 is a diagram for illustrating displaying of the captured image 38 on the monitor 27 in response to the designation operation. As indicated by symbol 4A in FIG. 4 and illustrated in the aforementioned FIG. 2, the operation unit 25 accepts input of the designation operation of designating any designated position SP on the waveform of the displacement detection signal D3 displayed on the monitor 27. Accordingly, for example, when an abnormal waveform ER is included in the waveform of the displacement detection signal D3 on the monitor 27, the operator can designate the abnormal waveform ER as the designated position SP.

As indicated by symbol 4B in FIG. 4, first, the display controller 56 determines the X-direction position of the displacement detector 20 corresponding to the designated position SP, based on the designation operation for the designated position SP to the operation unit 25. Next, based on the determined X-direction position, the display controller 56 refers to the data storage 50, and obtains the captured image 38 corresponding to the X-direction position from the saved data 51.

As indicated by symbol 4C in FIG. 4, the display controller 56 then causes the monitor 27 to display the captured image 38 obtained from the saved data 51, in addition to the displacement detection signal D3. The operator can thus verify the captured image 38 corresponding to the designated position SP. The herein described captured image 38 corresponding to the designated position SP indicates the captured image 38 taken by the camera 22 in synchronization with detection of the X-direction position of the displacement detector 20 corresponding to the designated position SP.

When the display controller 56 causes the monitor 27 to display the waveform of the displacement detection signal D3 together with the captured image 38, this unit causes the monitor 27 to display a cursor Cu indicating the designated position SP, on the waveform of the displacement detection signal D3, in a superimposed manner.

Figure 5:
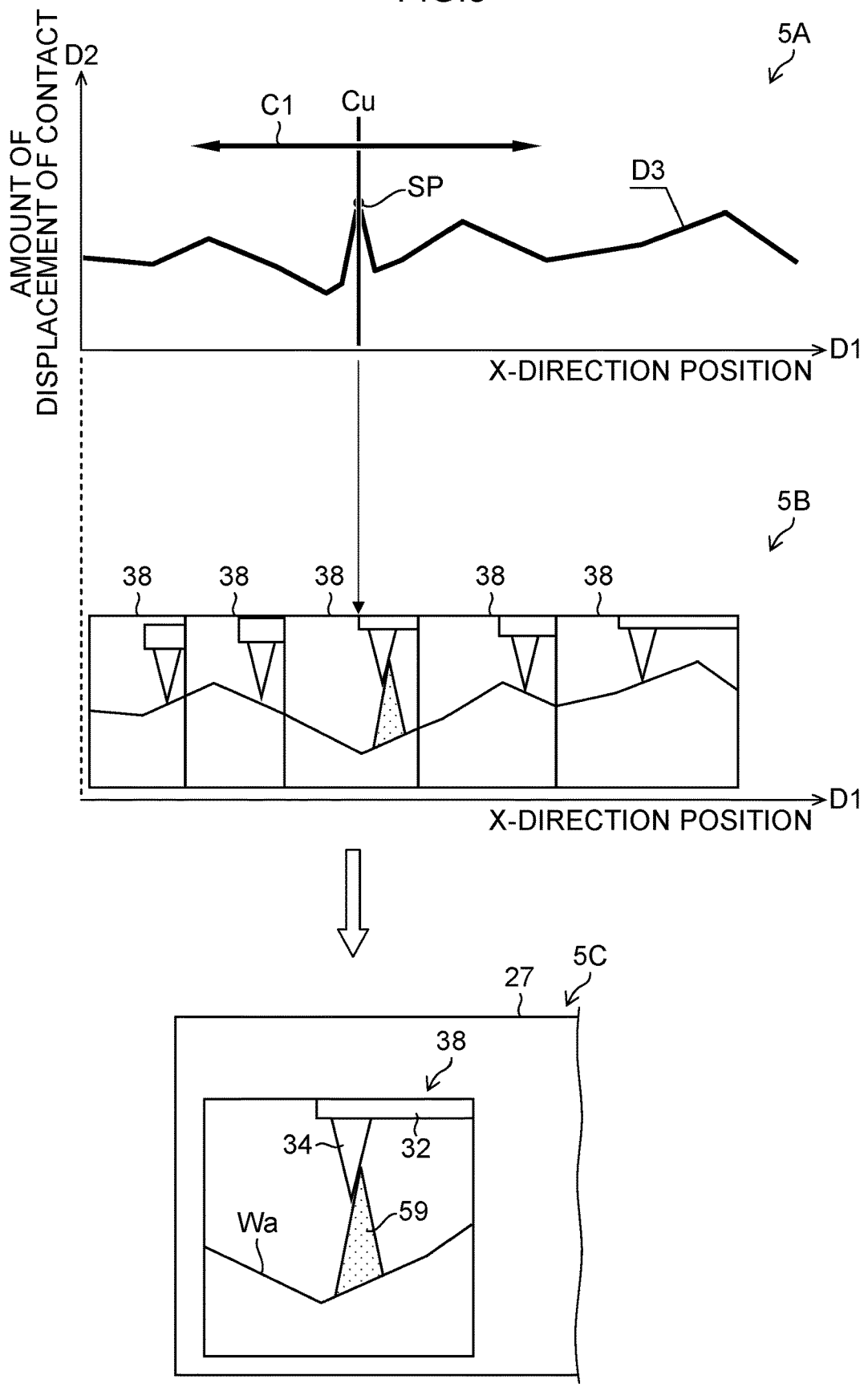
FIG. 5 is a diagram for illustrating display switching of the captured image on the monitor in response to a designated position changing operation.

FIG. 5 is a diagram for illustrating display switching of the captured image 38 on the monitor 27 in response to the operation for changing the designated position SP. As indicated by symbol 5A in FIG. 5, when the designated position changing operation C1 for moving the cursor Cu (designated position SP) in the X direction is input into the operation unit 25, the display controller 56 redetermines the X-direction position of the displacement detector 20 corresponding to the moved cursor Cu. Next, as illustrated in symbol 5B in FIG. 5, the display controller 56 obtains the captured image 38 corresponding to the X-direction position from the saved data 51, based on a redetermination result of the X-direction position of the displacement detector 20.

As indicated by symbol 5C in FIG. 5, the display controller 56 then updates the captured image 38 displayed on the monitor 27, based on the captured image 38 obtained from the saved data 51. Hereinafter, every time the designated position changing operation C1 for the cursor Cu (designated position SP) is executed, redetermination of the X-direction position of the displacement detector 20, obtainment of the captured image 38 from the saved data 51, and display update of the captured image 38 on the monitor 27 are repetitively executed. Accordingly, the operator can thus verify the captured image 38 corresponding to the desired position of the cursor Cu (designated position SP).

Every time the cursor Cu is moved, a coupled image (what is called a panoramic image) where captured images 38 before and after the designated position SP indicated by the cursor Cu are coupled together may be generated and the coupled image may be displayed on the monitor 27. Instead of simultaneous displaying of the captured image 38 and the displacement detection signal D3 on the monitor 27, any one may be selectively displayed.

Operation of First Embodiment

Figure 6:
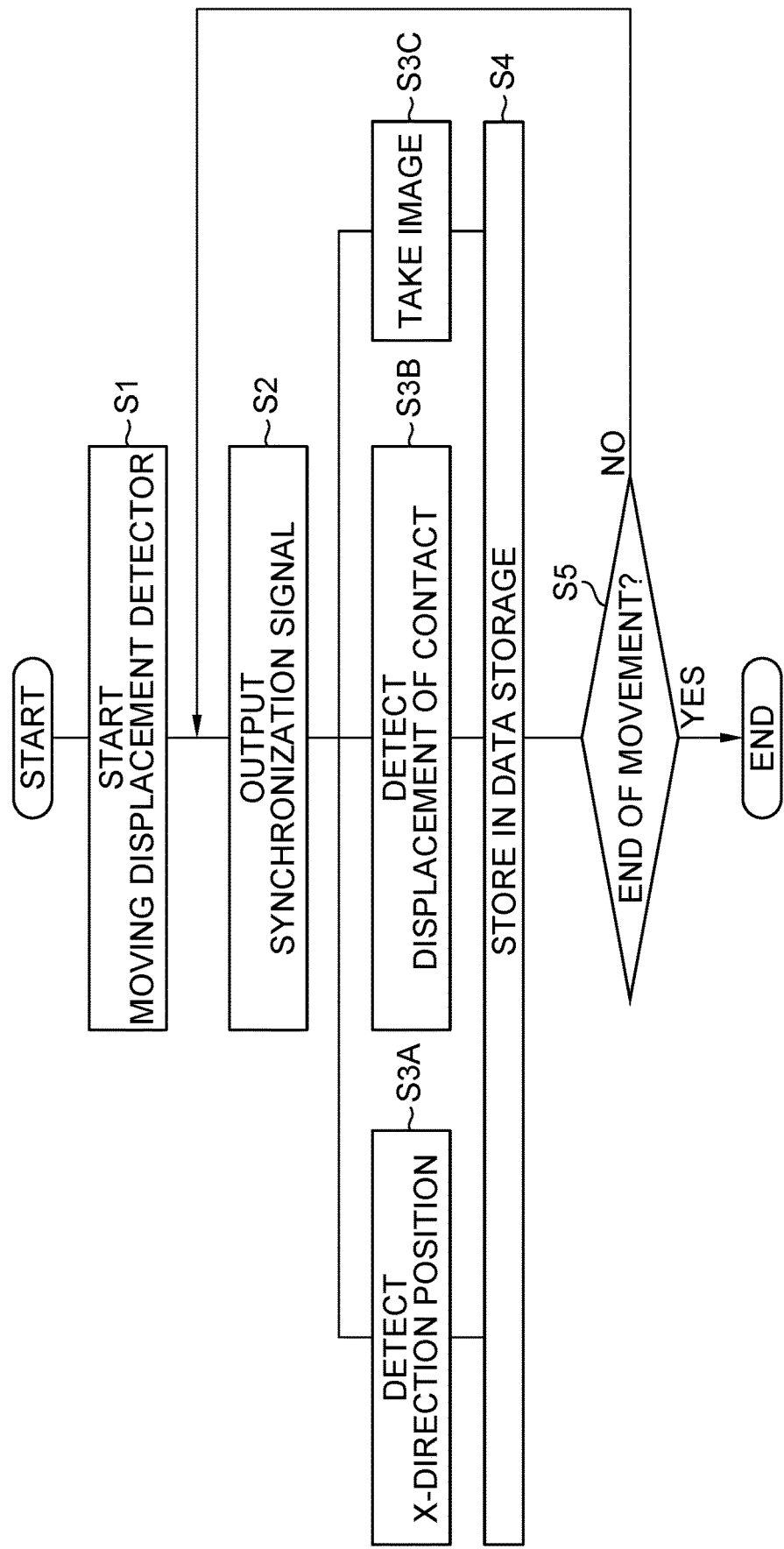
FIG. 6 is a flowchart illustrating the flow of a shape measurement process for a surface of a workpiece by the surface shape measurement device.

FIG. 6 is a flowchart illustrating the flow of the process of measuring the shape of the surface Wa of the workpiece W by the surface shape measurement device 10 according to the method for controlling the shape measurement device of the presently disclosed subject matter. As illustrated in FIG. 6, the operator sets the workpiece W on the measurement stage 12 and brings the distal end of the contact 34 into contact with the surface Wa, and subsequently performs the measurement start operation through the operation unit 25. In response to the operation, the drive controller 40 drives the detector moving mechanism 16, and moves the displacement detector 20 in the X direction (step S1). Thus, the surface Wa is traced by the contact 34 along the X direction.

In response to the measurement start operation, the synchronization controller 42 outputs the synchronization signal CL to the position detecting sensor 18, the displacement detecting sensor 36 and the camera 22 (step S2; corresponding to a synchronization control step in the presently disclosed subject matter). Accordingly, the three actions that include detection of the X-direction position of the displacement detector 20 by the position detecting sensor 18 (step S3A), detection of the displacement of the contact 34 by the displacement detecting sensor 36 (step S3B), and imaging of the contact 34 by the camera 22 (step S3C) are executed in synchronization together. Step S3A corresponds to a position detecting step in the presently disclosed subject matter, step S3B corresponds to a displacement detecting step in the presently disclosed subject matter, and step S3C corresponds to an imaging step in the presently disclosed subject matter.

Next, the X-direction position detection result D1 detected by the position detecting sensor 18, and the displacement detection result D2 detected by the displacement detecting sensor 36 are input into the storage controller 48 via the signal obtaining unit 44. The captured image 38 taken by the camera 22 is input into the storage controller 48 via the image obtaining unit 46. As illustrated in the aforementioned FIG. 3, the storage controller 48 then stores the X-direction position detection result D1, the displacement detection result D2, and the captured image 38 obtained by the three actions in synchronization together, in the saved data 51, in an associated manner (step S4).

Hereinafter, until movement of the displacement detector 20 is finished, processes from steps S2 to S4 are repetitively executed (step S5). Accordingly, during surface shape measurement, the three actions are repetitively executed in synchronization together according to the synchronization signal CL, and every time the three actions are executed, the X-direction position detection result D1, the displacement detection result D2, and the captured image 38 are repetitively stored in the saved data 51 in the state of being associated together.

Figure 7:
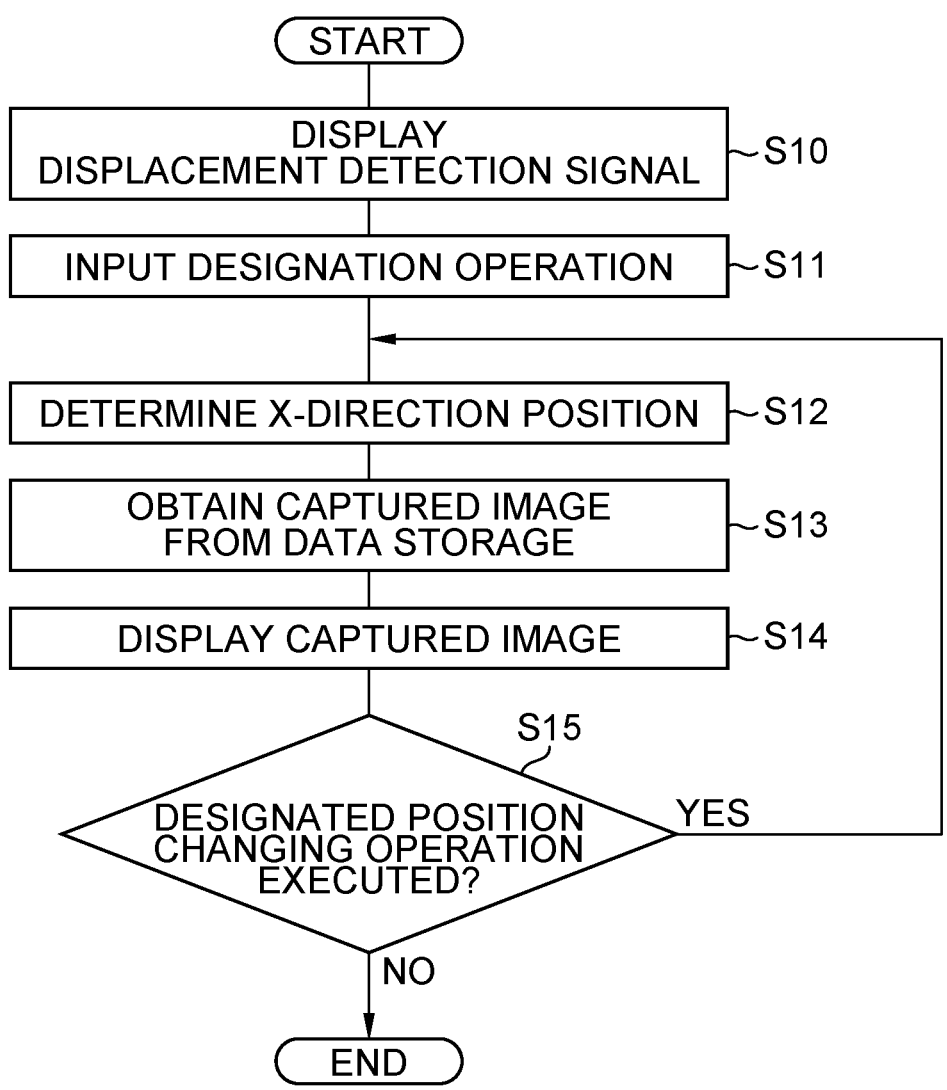
FIG. 7 is a flowchart illustrating the flow of a process of displaying a displacement detection signal and the captured image by the surface shape measurement device.

FIG. 7 is a flowchart illustrating the flow of the process of displaying the displacement detection signal D3 and the captured image 38 by the surface shape measurement device 10. As illustrated in FIG. 7, after the shape measurement of the surface Wa is finished, the operator executes the operation for displaying the displacement detection signal D3 to the operation unit 25, and the signal generator 52 then refers to the saved data 51, and generates the displacement detection signal D3. The low-pass filtering is applied to the displacement detection signal D3 by the low-pass filter 54, and subsequently, the signal is input into the display controller 56. The display controller 56 causes the monitor 27 to display the displacement detection signal D3 having been subjected to the low-pass filtering (step S10).

After the displacement detection signal D3 is displayed on the monitor 27, the operator inputs, into the operation unit 25, the designation operation of designating any designated position SP in the displacement detection signal D3 (e.g., any point in the abnormal waveform ER) on the monitor 27 as illustrated in the aforementioned FIG. 4 (step S11). In response to the operation, the display controller 56 determines the X-direction position of the displacement detector 20 corresponding to the designated position SP (step S12), and obtains the captured image 38 corresponding to the X-direction position from the saved data 51 (step S13).

Next, the display controller 56 causes the monitor 27 to display the displacement detection signal D3, and the captured image 38 obtained from the saved data 51, and display the cursor Cu on the waveform of the displacement detection signal D3 in a superimposed manner (step S14). Accordingly, when the operator designates the abnormal waveform ER as the designated position SP, the operator can easily determine whether the cause of the abnormal waveform ER is caused by the foreign matter 59 adhering to the surface Wa or a scratch on the surface Wa, based on the captured image 38 corresponding to the designated position SP.

Next, as illustrated in the aforementioned FIG. 5, the operator executes the designated position changing operation C1 for the cursor Cu through the operation unit 25, the aforementioned processes of steps S12 to S14 are repetitively executed, thereby allowing the monitor 27 to display the captured image 38 corresponding to the position (designated position SP) of the cursor Cu whose position has been changed (step S15). Accordingly, the operator can verify the captured images 38 taken before and after the abnormal waveform ER, which can easily detect the cause of the abnormal waveform ER.

Advantageous Effects of First Embodiment

As described above, according to the first embodiment, during surface shape measurement, the three actions (detection of the X-direction position, detection of the displacement of the contact 34, and imaging of the contact 34) are repetitively executed in synchronization together. Accordingly, every time the three actions are executed, the X-direction position detection result D1, the displacement detection result D2, and the captured image 38 can be stored in the saved data 51 in an associated manner. As a result, the operator can verify the captured image 38 corresponding to the desired position on the waveform of the displacement detection signal D3. Accordingly, the cause of abnormality in shape measurement of the surface Wa can be effectively and easily detected.

Second Embodiment

Figure 8:
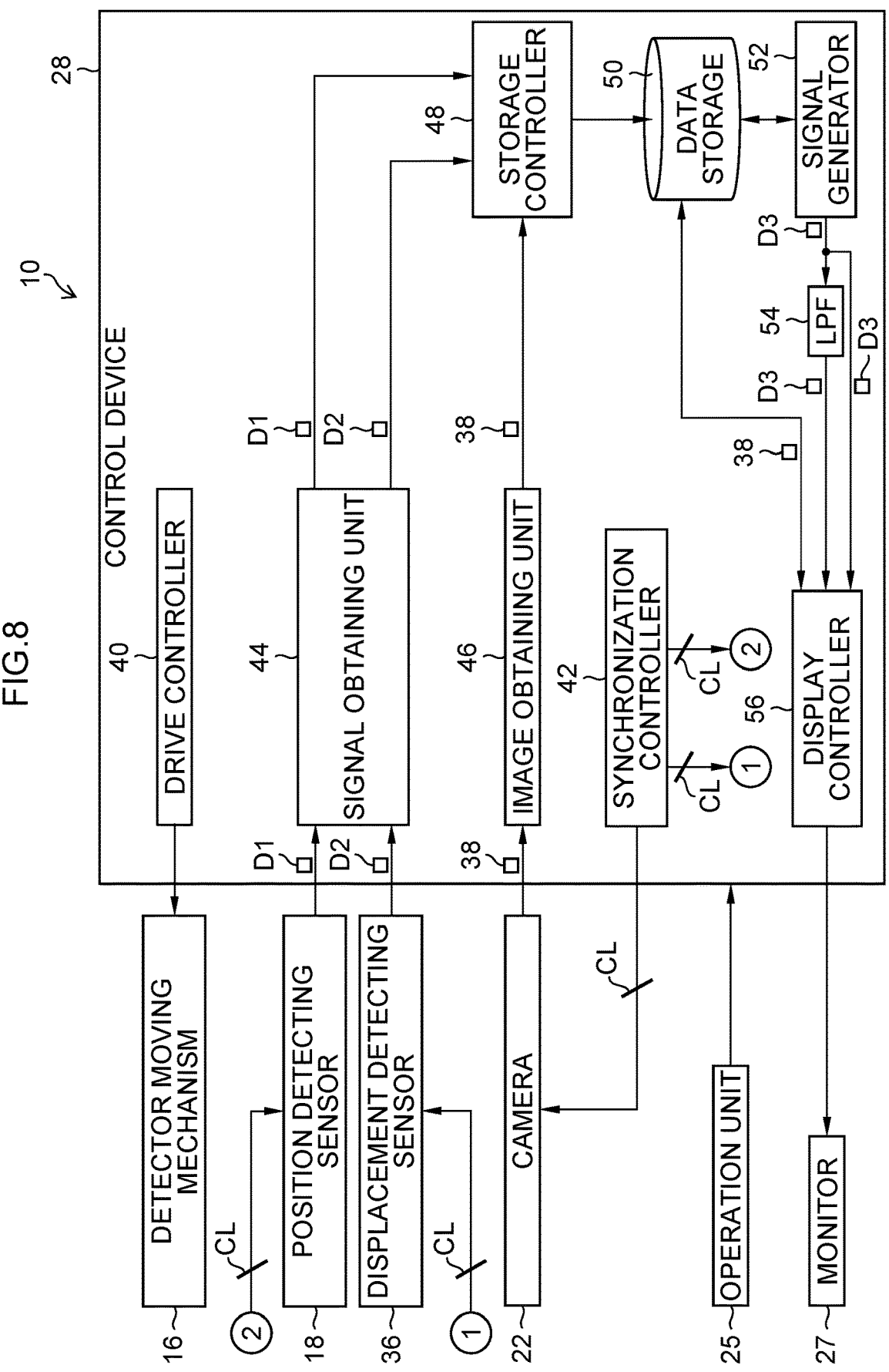
FIG. 8 is a block diagram illustrating a configuration of a control device of a surface shape measurement device according to a second embodiment.
Figure 9:
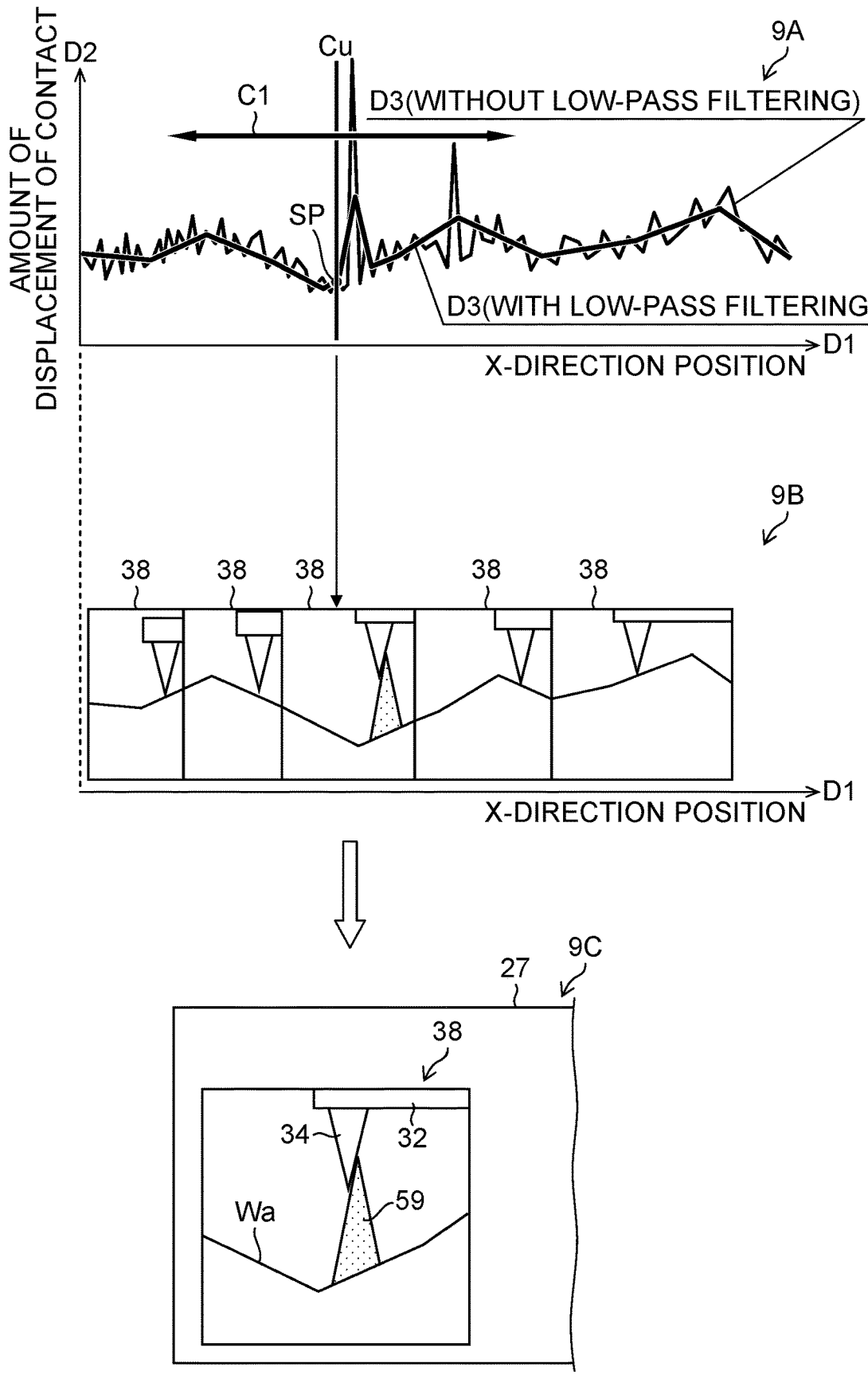
FIG. 9 is a diagram for illustrating the waveform of a displacement detection signal and a captured image 38 displayed on a monitor according to the second embodiment.

FIG. 8 is a block diagram illustrating the configuration of the control device 28 of the surface shape measurement device 10 according to a second embodiment. FIG. 9 is a diagram for illustrating the waveform of the displacement detection signal D3 and the captured image 38 displayed on the monitor 27 according to the second embodiment. Note that the surface shape measurement device 10 according to the second embodiment has the configuration basically identical to that of the first embodiment except in that the method of displaying the displacement detection signal D3 on the monitor 27 is different. Accordingly, what is the same as the function or the component in the first embodiment is assigned the same symbol, and its description is omitted.

The display controller 56 according to the first embodiment described above causes the monitor 27 to display the displacement detection signal D3 having been subjected to the low-pass filtering by the low-pass filter 54. In this case, it is difficult to determine the projecting shape (false shape) of the waveform caused by the foreign matter 59 or the like adhering to the surface Wa, from the waveform of the displacement detection signal D3.

As indicated by symbol 9A in FIGS. 8 and 9, the display controller 56 in the second embodiment has a superimposed display mode for causing the monitor 27 to display the displacement detection signals D3 before and after the low-pass filtering by the low-pass filter 54 in a superimposed manner. Accordingly, it is possible to easily determine the false shape described above difficult to determine owing to the low-pass filtering.

As indicated by symbols 9B and 9C in FIG. 9, the cursor Cu (designated position SP) is set at the position where the false shape occurs on the waveform of the displacement detection signal D3, thereby allowing the monitor 27 to display the captured image 38 therearound. Accordingly, the cause of abnormality in shape measurement of the surface Wa can be more accurately identified, which can improve the reliability of the shape measurement.

Third Embodiment

Figure 10:
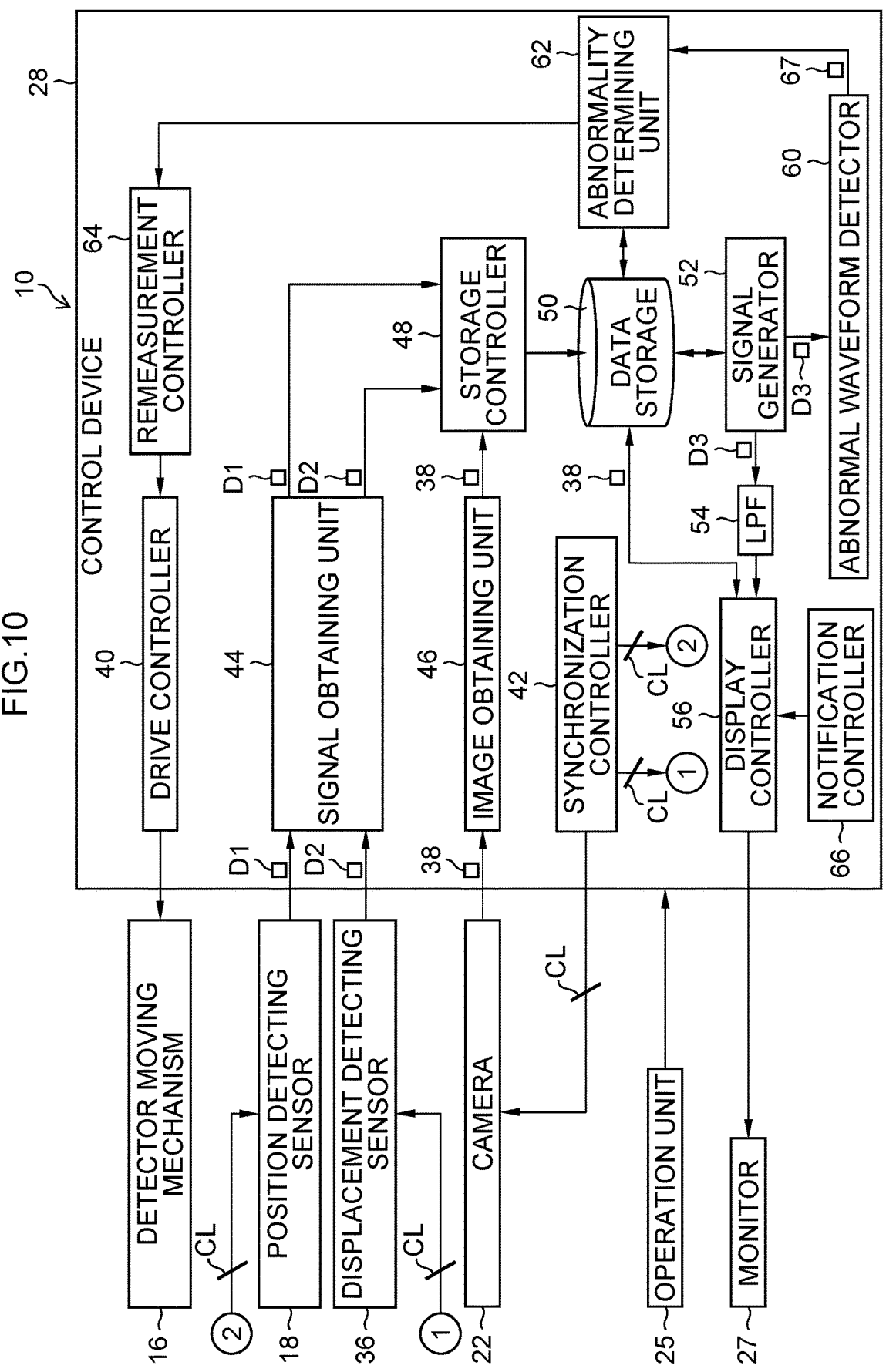
FIG. 10 is a block diagram illustrating a configuration of a control device of a surface shape measurement device according to a third embodiment.

FIG. 10 is a block diagram illustrating the configuration of the control device 28 of the surface shape measurement device 10 according to a third embodiment. The surface shape measurement device 10 according to the third embodiment determines presence or absence of abnormality in the shape measurement of the surface Wa, based on the displacement detection signal D3. When the device determines that abnormality is present in shape measurement, remeasurement of the shape of the surface Wa is executed.

The surface shape measurement device 10 according to the third embodiment has the configuration basically identical to that of each embodiment described above except in that the control device 28 includes an abnormal waveform detector 60, an abnormality determining unit 62, a remeasurement controller 64 and a notification controller 66. Accordingly, what is the same as the function or the component in each embodiment described above is assigned the same symbol, and its description is omitted.

The abnormal waveform detector 60 detects the abnormal waveform ER from the waveform of the displacement detection signal D3 generated by the signal generator 52.

Figure 11:
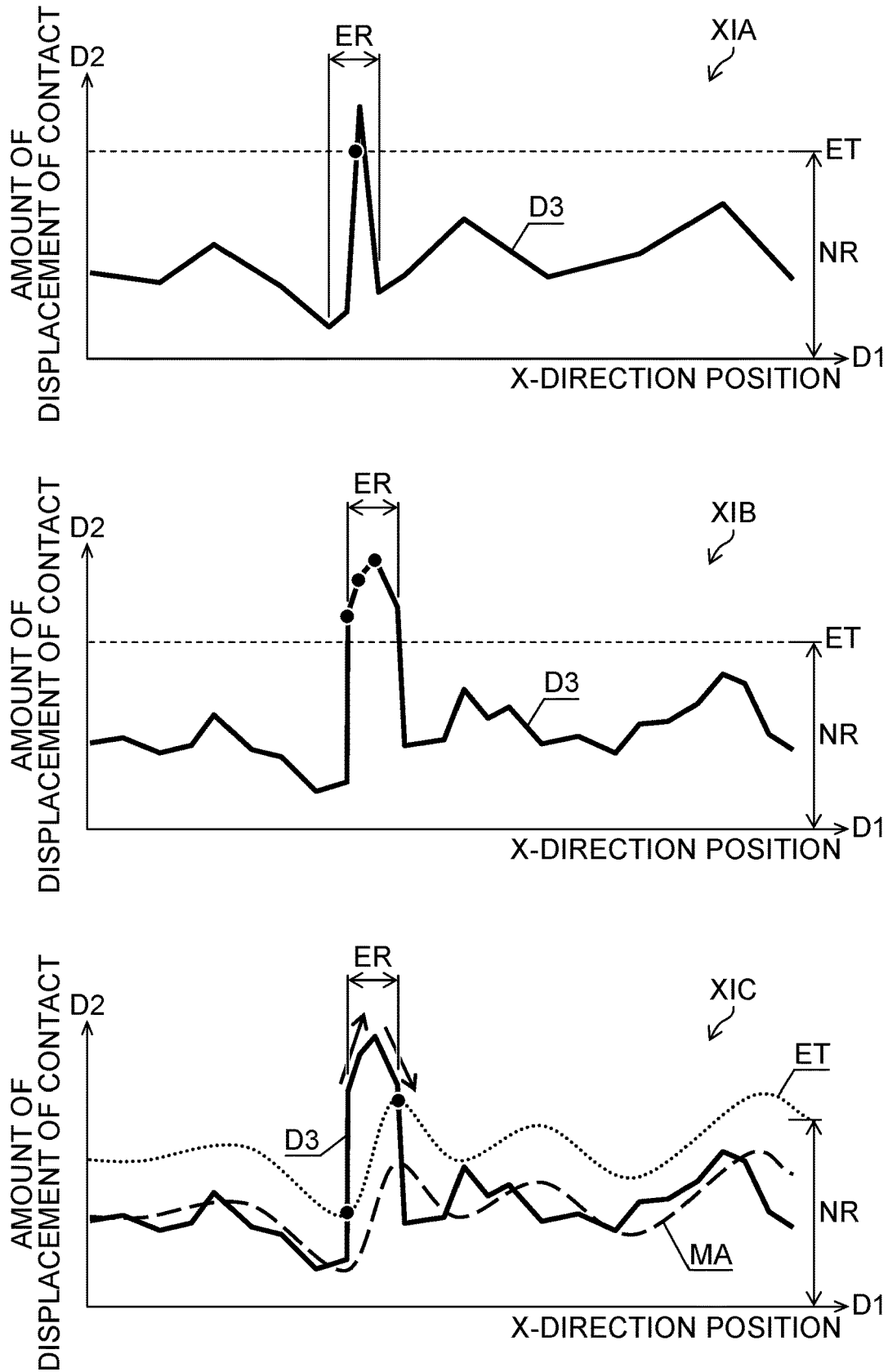
FIG. 11 is a diagram for illustrating first to third examples of detecting an abnormal waveform by an abnormal waveform detector.

FIG. 11 is a diagram for illustrating first to third examples of detecting the abnormal waveform ER by the abnormal waveform detector 60.

As indicated by symbol XIA in FIG. 11, in the first example, the abnormal waveform detector 60 determines presence or absence of occurrence of the abnormal waveform ER, based on the displacement detection signal D3, according to whether the amount of displacement of the contact 34 in the Z direction is larger than a predetermined abnormality determination threshold ET or accommodated in a normal range NR (below an abnormality determination threshold ET). When the abnormal waveform detector 60 determines that occurrence of the abnormal waveform ER is present, this unit outputs range information 67 (corresponding to a first range of the presently disclosed subject matter) indicating the X-direction position range of the abnormal waveform ER, to the abnormality determining unit 62.

As indicated by symbol XIB in FIG. 11, in the second example, if the state where the amount of displacement of the contact 34 in the Z direction exceeds the abnormality determination threshold ET continues for a predetermined time period or longer, the abnormal waveform detector 60 determines that occurrence of the abnormal waveform ER is present, based on the displacement detection signal D3, and outputs the range information 67 on the abnormal waveform ER to the abnormality determining unit 62. Accordingly, erroneous detection of presence of occurrence of the abnormal waveform ER due to noise in the displacement detection signal D3 is prevented.

As indicated by symbol XIC in FIG. 11, in the third example, the abnormal waveform detector 60 computes a moving average line MA of the amount of displacement of the contact 34 in the Z direction, based on the displacement detection signal D3. When the state where the deviation of the amount of displacement from the moving average line MA exceeds the abnormality determination threshold ET is returned to the original state (the state of being in the abnormality determination threshold ET), the abnormal waveform detector 60 determines that occurrence of the abnormal waveform ER is present, and outputs the range information 67 on the abnormal waveform ER to the abnormality determining unit 62. Accordingly, the drift of the displacement detection signal D3 can be determined from the abnormal waveform ER, which can improve the detection accuracy of the abnormal waveform detector 60.

Figure 12:
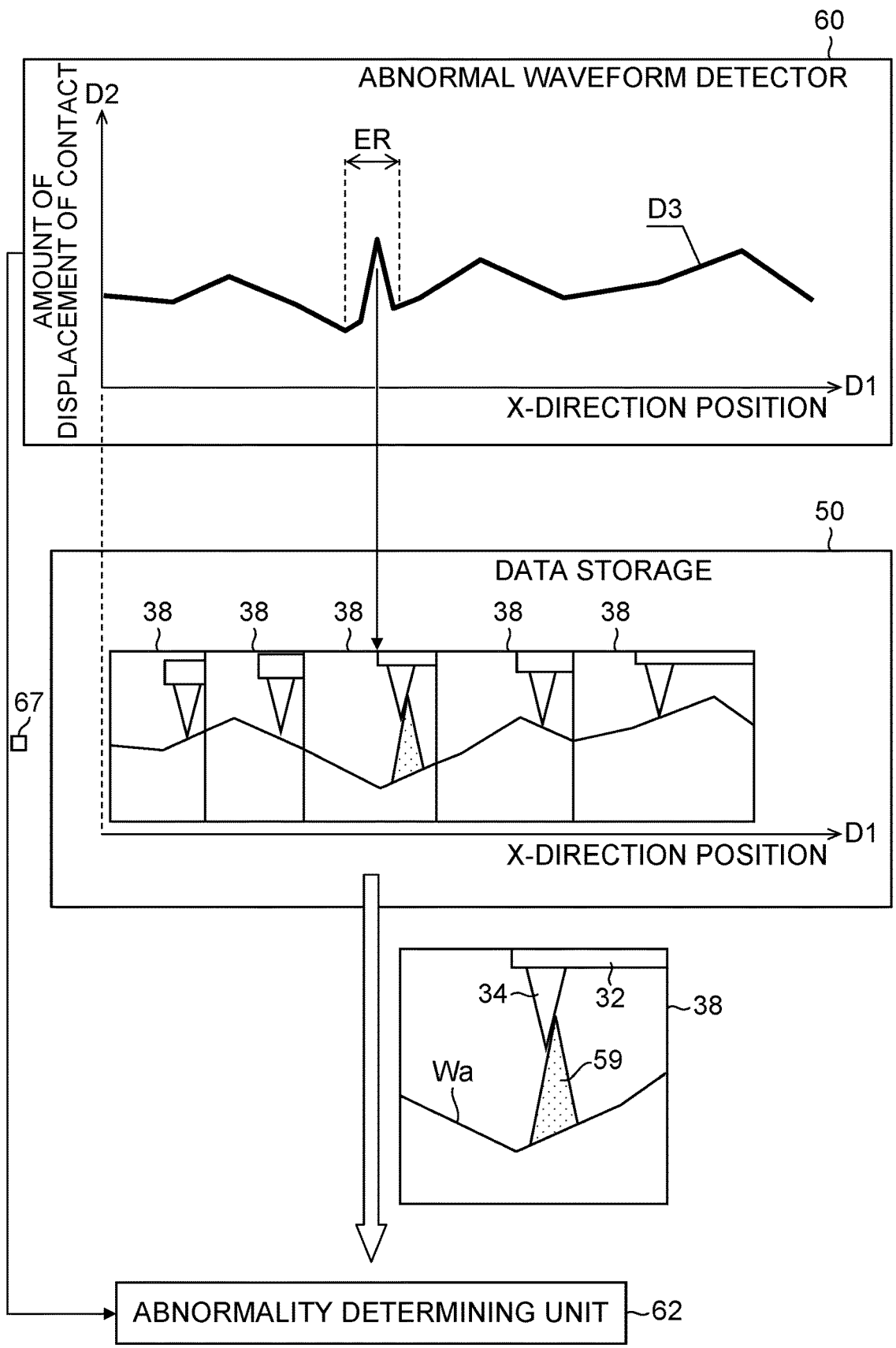
FIG. 12 is a diagram for illustrating a process of determining presence or absence of abnormality in shape measurement of a surface by an abnormality determining unit.

FIG. 12 is a diagram for illustrating a process of determining presence or absence of abnormality in shape measurement of the surface Wa by the abnormality determining unit 62. As illustrated in FIG. 12, the abnormality determining unit 62 corresponds to a first abnormality determining unit of the presently disclosed subject matter, refers to the saved data 51 (captured image 38) and determines presence or absence of abnormality in the shape measurement of the surface Wa, based on the range information 67 on the abnormal waveform ER input from the abnormal waveform detector 60.

Specifically, based on the range information 67 input from the abnormal waveform detector 60, the abnormality determining unit 62 obtains, from the saved data 51, the captured image 38 corresponding to the X-direction position (range) of the displacement detector 20 indicated by the range information 67, i.e., the captured image 38 corresponding to the position of occurrence of the abnormal waveform ER. The abnormality determining unit 62 then applies image analysis to the captured image 38 corresponding to the position of occurrence of the abnormal waveform ER by a publicly known method (a pattern matching method or the like), and determines presence or absence of abnormality in the shape measurement of the surface Wa, based on whether an image of the foreign matter 59 or a scratch (not illustrated) is included in the captured image 38 or not.

Returning to FIG. 10, when the abnormality determining unit 62 determines that abnormality is present in shape measurement, the remeasurement controller 64 drives the detector moving mechanism 16 through the drive controller 40 and moves the displacement detector 20 in the X direction, thus executing remeasurement that retraces the region to be measured on the surface Wa along the X direction by the contact 34. Accordingly, similar to each embodiment described above, the aforementioned three actions are repetitively executed in synchronization together, and every time the three actions are executed, the X-direction position detection result D1, the displacement detection result D2, and the captured image 38 are stored in the saved data 51 in an associated manner. According to this embodiment, the entire region of the region to be measured on the surface Wa is remeasured. Alternatively, only the position of occurrence of the abnormal waveform ER in the region to be measured may be remeasured based on the range information 67.

When the remeasurement is executed by the remeasurement controller 64, the generation of the displacement detection signal D3 by the signal generator 52, the detection of the abnormal waveform ER by the abnormal waveform detector 60, and the determination by the abnormality determining unit 62 are repetitively executed. Hereafter, every time the abnormality determining unit 62 determines that abnormality in shape measurement is present, the remeasurement by the remeasurement controller 64, the generation of the displacement detection signal D3 by the signal generator 52, the detection of the abnormal waveform ER by the abnormal waveform detector 60, and the determination by the abnormality determining unit 62 are repetitively executed within a range of the certain number, described later.

Figure 13:
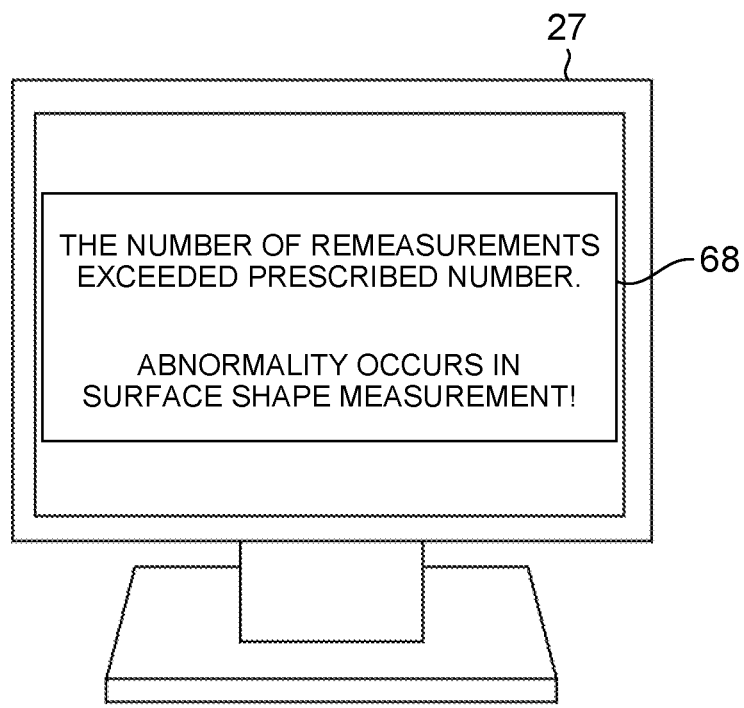
FIG. 13 is a diagram for illustrating notification about warning information by a notification controller according to the third embodiment.

FIG. 13 is a diagram for illustrating notification about warning information 68 by the notification controller 66 according to the third embodiment. As illustrated in FIG. 13 and the aforementioned FIG. 10, the notification controller 66, accompanied by the monitor 27, constitutes a notification unit of the presently disclosed subject matter. When the number of executions of remeasurement by the remeasurement controller 64 exceeds the predetermined certain number, the notification controller 66 causes the monitor 27 to display the warning information 68 indicating this fact. The operator can thus be notified of occurrence of abnormality in shape measurement of the workpiece W (surface Wa). Instead of causing the monitor 27 to display the warning information 68, the monitor 27 may be caused to display the warning information 68 and this warning information 68 may be audio-output through a speaker (corresponding to the notification unit), not illustrated.

Figure 14:
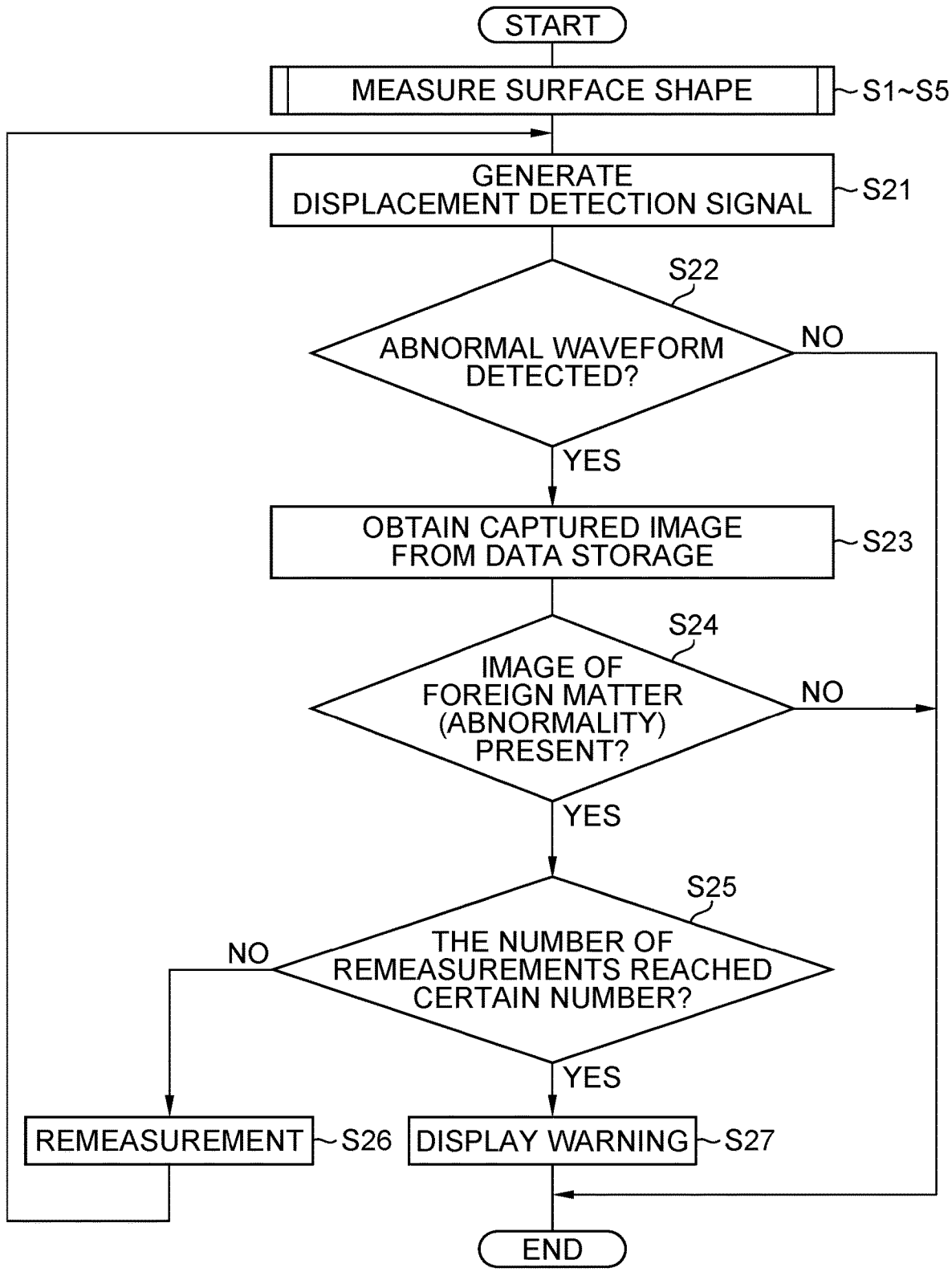
FIG. 14 is a flowchart illustrating the flow of a remeasurement process and a warning process by the surface shape measurement device according to the third embodiment.

FIG. 14 is a flowchart illustrating the flow of a remeasurement process and a warning process by the surface shape measurement device 10 according to the third embodiment. The flow of shape measurement of the surface Wa of the workpiece W in steps S1 to S5 is similar to that in the first embodiment illustrated in FIG. 6 described above. Accordingly, the specific description is herein omitted.

After the shape measurement of the surface Wa at the first time is finished, the signal generator 52 refers to the saved data 51 and generates the displacement detection signal D3 (step S21). After the generation of the displacement detection signal D3 is finished, as illustrated in the aforementioned FIG. 11 the abnormal waveform detector 60 detects the abnormal waveform ER in the waveform of the displacement detection signal D3, and when the abnormal waveform ER is included in the displacement detection signal D3, this unit outputs the range information 67 to the abnormality determining unit 62 (step S22).

Next, based on the range information 67 input from the abnormal waveform detector 60, the abnormality determining unit 62 obtains, from the saved data 51, the captured image 38 corresponding to the position of occurrence of the abnormal waveform ER as illustrated in the aforementioned FIG. 12 (step S23). The abnormality determining unit 62 then determines whether the image of the foreign matter 59 or a scratch (not illustrated) is included in the captured image 38 or not using a publicly known image analysis method, thus determining presence or absence of abnormality in the shape measurement of the surface Wa (step S24).

When the abnormality determining unit 62 determines that abnormality in shape measurement is present (YES in step S24; NO in step S25), the remeasurement controller 64 executes remeasurement of the shape of the surface Wa by driving the detector moving mechanism 16 through the drive controller 40 (step S26). Accordingly, the aforementioned three actions are repetitively executed in synchronization together, and every time the three actions are executed, the X-direction position detection result D1, the displacement detection result D2, and the captured image 38 can be stored in the saved data 51 in an associated manner.

After the remeasurement is completed, the processes of steps S21 to S24 are repetitively executed. When the abnormality determining unit 62 determines that abnormality in shape measurement is present and the number of remeasurements is less than the certain number described above, the processes of steps S26 and S21 to S24 are repetitively executed again (YES in step S24; NO in step S25). Hereafter, until the number of remeasurements reaches the certain number, the processes described above are repetitively executed every time the abnormality determining unit 62 determines that abnormality in shape measurement is present. Even when a false shape caused by the foreign matter 59 adhering to the surface Wa occurs in the displacement detection signal D3, repetitive execution of remeasurement reduces the risk of adopting the false shape as a measurement result.

When the number of remeasurements exceeds the certain number, the notification controller 66 performs warning display that causes the monitor 27 to display the warning information 68 indicating the fact as illustrated in the aforementioned FIG. 13 (YES in step S25; step S27). The operator can thus be notified of occurrence of abnormality in shape measurement of the surface Wa. As a result, the operator can recognize occurrence of abnormality, and quickly execute verification of the occurrence factor of the abnormality.

As described above, according to the third embodiment, presence or absence of abnormality in the shape measurement of the surface Wa is determined based on the waveform of the displacement detection signal D3, and when abnormality occurs in the shape measurement, remeasurement is performed, which can more accurately determine whether the abnormality is caused by the actual shape of the surface Wa or caused by an external environmental factor (the foreign matter 59 or the like).

Fourth Embodiment

Figure 15:
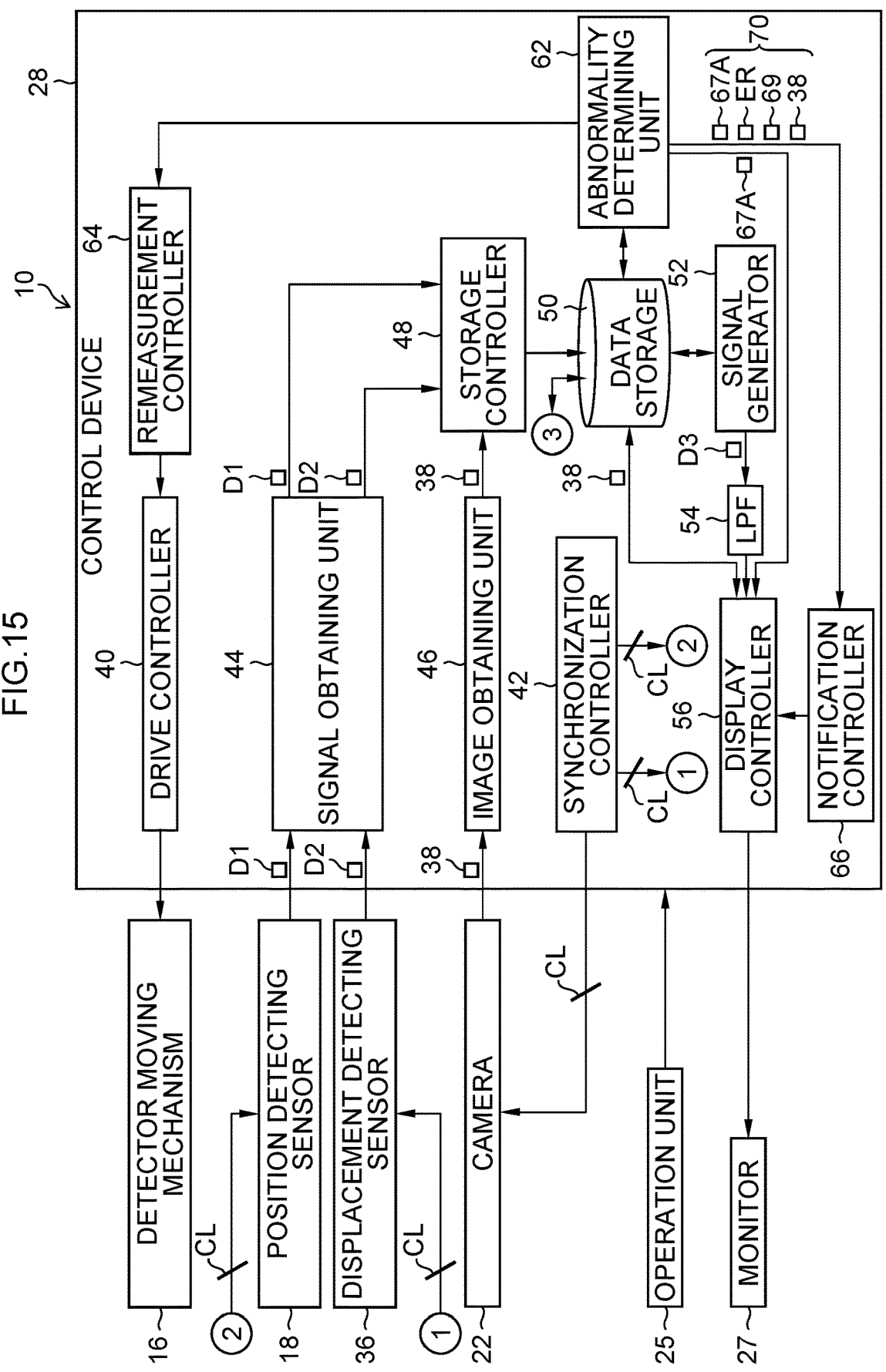
FIG. 15 is a block diagram illustrating a configuration of a control device of a surface shape measurement device according to a fourth embodiment.

FIG. 15 is a block diagram illustrating the configuration of the control device 28 of the surface shape measurement device 10 according to a fourth embodiment. The abnormality determining unit 62 in the third embodiment described above determines presence or absence of abnormality in the shape measurement of the surface Wa based on the displacement detection signal D3. The abnormality determining unit 62 in the fourth embodiment determines presence or absence of abnormality in the shape measurement based on the captured image 38 stored in the saved data 51.

As illustrated in FIG. 15, the surface shape measurement device 10 according to the fourth embodiment has the configuration basically identical to that of the surface shape measurement device 10 in the third embodiment. Accordingly, what is the same as the function or the component in the third embodiment described above is assigned the same symbol, and its description is omitted.

Figure 16:
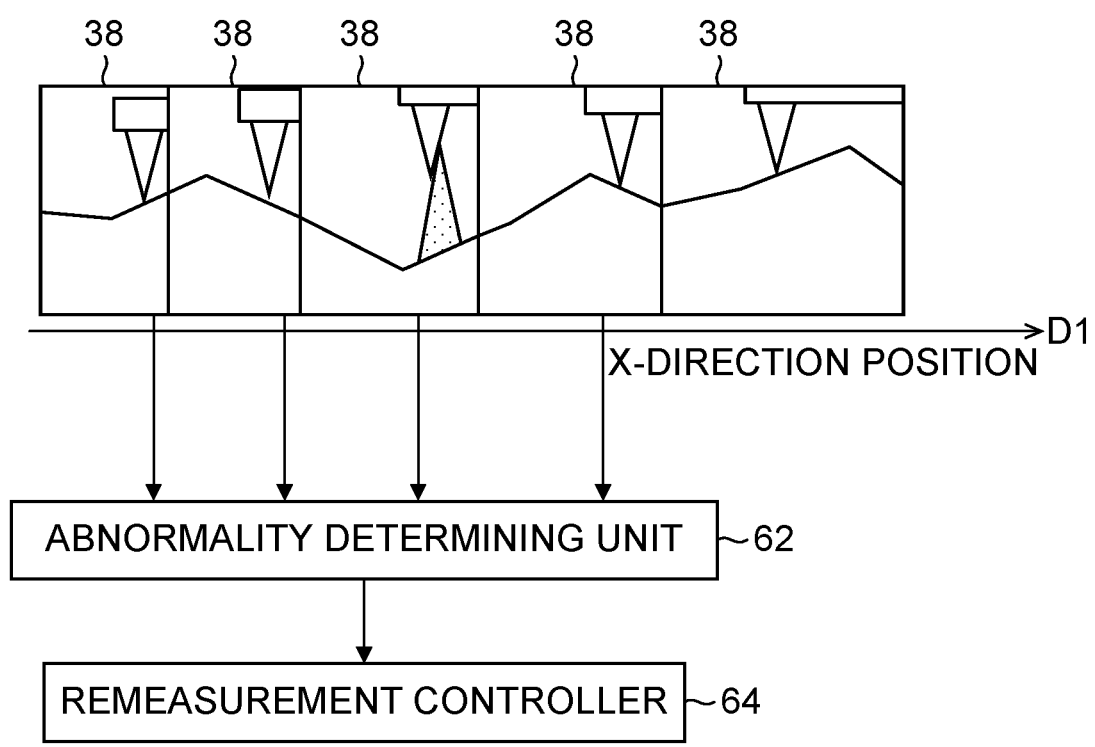
FIG. 16 is a diagram for illustrating a process of determining presence or absence of abnormality in shape measurement of a surface by an abnormality determining unit according to the fourth embodiment.

FIG. 16 is a diagram for illustrating a process of determining presence or absence of abnormality in the shape measurement of the surface Wa by the abnormality determining unit 62 (corresponding to a second abnormality determining unit of the presently disclosed subject matter) in the fourth embodiment.

As illustrated in FIG. 16 and the aforementioned FIG. 15, the abnormality determining unit 62 in the fourth embodiment individually applies image analysis to each captured image 38 stored in the saved data 51 by a publicly known method similar to that in the third embodiment. Specifically, the abnormality determining unit 62 determines presence or absence of abnormality in the shape measurement, with respect to each captured image 38 in the saved data 51, based on whether the image of the foreign matter 59 or a scratch (not illustrated) is included in the captured image 38 or not. Accordingly, when the abnormality determining unit 62 determines that abnormality in the shape measurement is present, remeasurement is executed by the remeasurement controller 64, similar to the third embodiment. The entire region to be measured on the surface Wa may be remeasured. Alternatively, only the position of occurrence of the abnormal waveform ER in the region to be measured may be remeasured based on range information 67A described later.

When the abnormality determining unit 62 determines that abnormality in the shape measurement of the surface Wa is present, this unit refers to the saved data 51 and generates the range information 67A (corresponding to a second range of the presently disclosed subject matter) indicating the X-direction position range of the displacement detector 20 corresponding to the captured image 38 determined to have abnormality in the shape measurement. The abnormality determining unit 62 outputs the range information 67A to the display controller 56.

Furthermore, when the abnormality determining unit 62 determines that abnormality in the shape measurement of the surface Wa is present, this unit extracts data on the abnormal waveform ER corresponding to the range information 67A from the displacement detection signal D3 generated by the signal generator 52, based on the range information 67A described above. Moreover, based on an image analysis result of the captured image 38 determined to have abnormality in the shape measurement, the abnormality determining unit 62 generates abnormality detailed information 69 indicating details of abnormality in the shape measurement (e.g., adhesion of the foreign matter 59 or the like). The abnormality determining unit 62 generates warning information 70 (see FIG. 18) including the range information 67A, data on the abnormal waveform ER, the abnormality detailed information 69, and the captured image 38 determined to have abnormality in the shape measurement, and outputs the warning information 70 to the notification controller 66.

Figure 17:
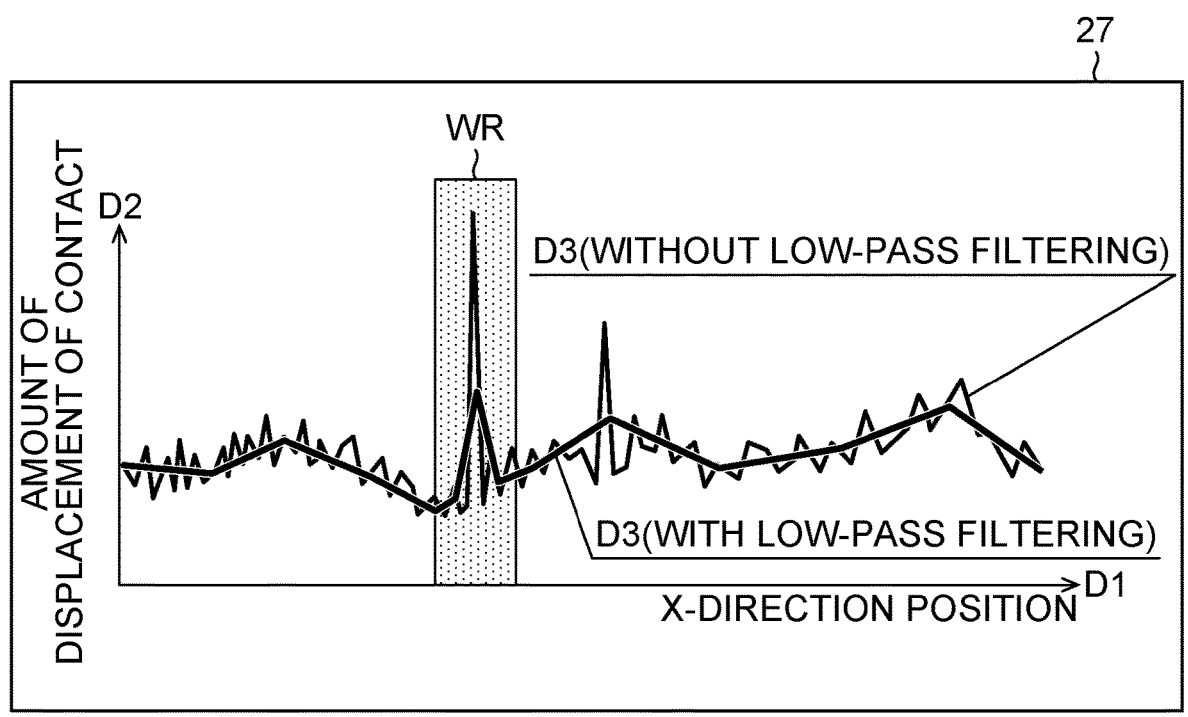
FIG. 17 is a diagram for illustrating an example of a displacement detection signal displayed on a monitor when an abnormality determining unit determines that abnormality of surface shape measurement is present.

FIG. 17 is a diagram for illustrating an example of the displacement detection signal D3 displayed on the monitor 27 when the abnormality determining unit 62 determines that abnormality in the shape measurement of the surface Wa is present. As illustrated in FIG. 17, when the abnormality determining unit 62 determines that abnormality of the shape measurement is present, the display controller 56 causes the monitor 27 to display the displacement detection signal D3.

At this time, based on the range information 67A input from the abnormality determining unit 62, the display controller 56 displays a waveform region WR corresponding to the range information 67A in the waveform of the displacement detection signal D3 to be displayed on the monitor 27, in an identifiable manner, for example, displaying with a color or the like. Accordingly, the operator can be notified of the position and range of the range information 67A where abnormality in shape measurement occurs. The display mode is not specifically limited as long as the waveform region WR is identifiable.

Figure 18:
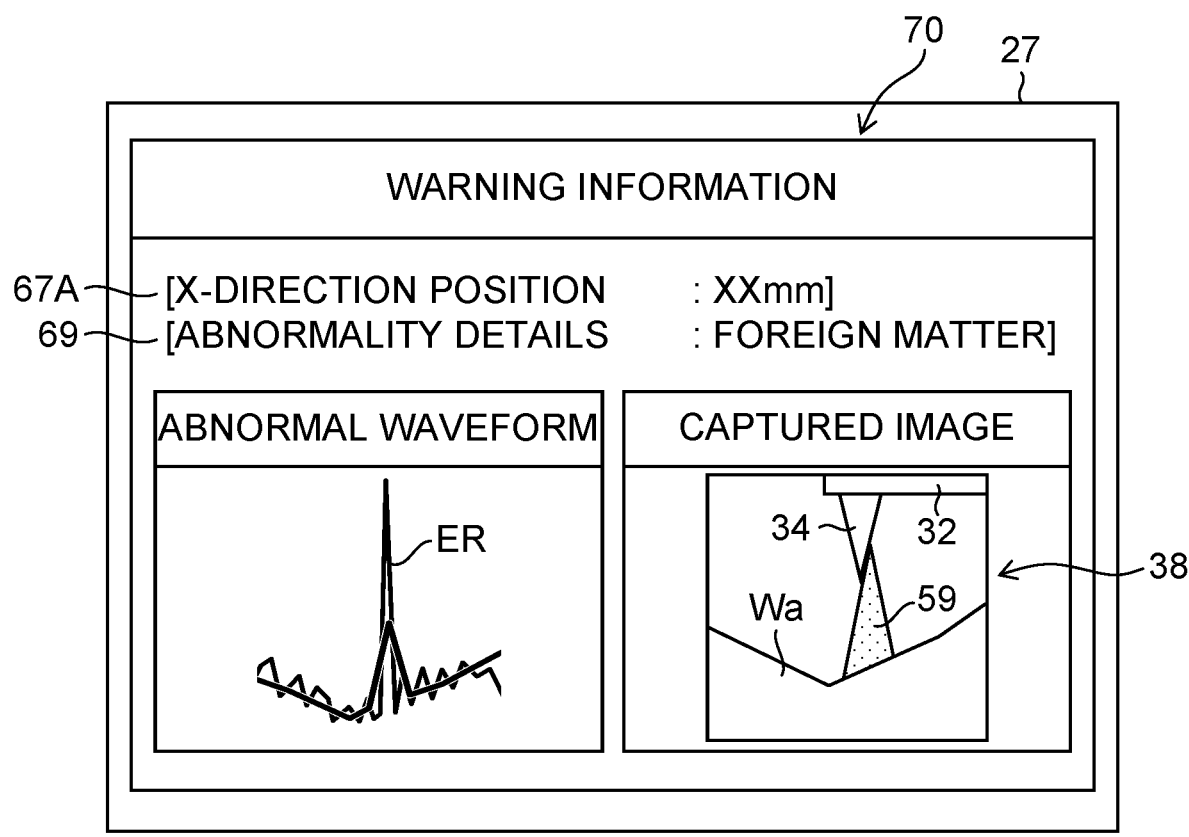
FIG. 18 is a diagram for illustrating notification about warning information by a notification controller according to the fourth embodiment.

FIG. 18 is a diagram for illustrating notification about the warning information 70 by the notification controller 66 according to the fourth embodiment. As illustrated in FIG. 18, when the abnormality determining unit 62 determines that abnormality in the shape measurement of the surface Wa is present, the notification controller 66 in the fourth embodiment controls the display controller 56 and causes the monitor 27 to display the warning information 70, based on the warning information 70 input from the abnormality determining unit 62. Accordingly, the operator can be notified of occurrence of abnormality of the shape measurement of the surface Wa, the position (range) of occurrence and details of the abnormality, the abnormal waveform ER, and the captured image 38 at the abnormality occurrence position.

As described above, according to the fourth embodiment, based on the captured image 38 stored in the data storage 50 (saved data 51), presence or absence of abnormality in the shape measurement can be determined. Consequently, advantageous effects similar to those in the third embodiment can be achieved.

Fifth Embodiment

Figure 19:
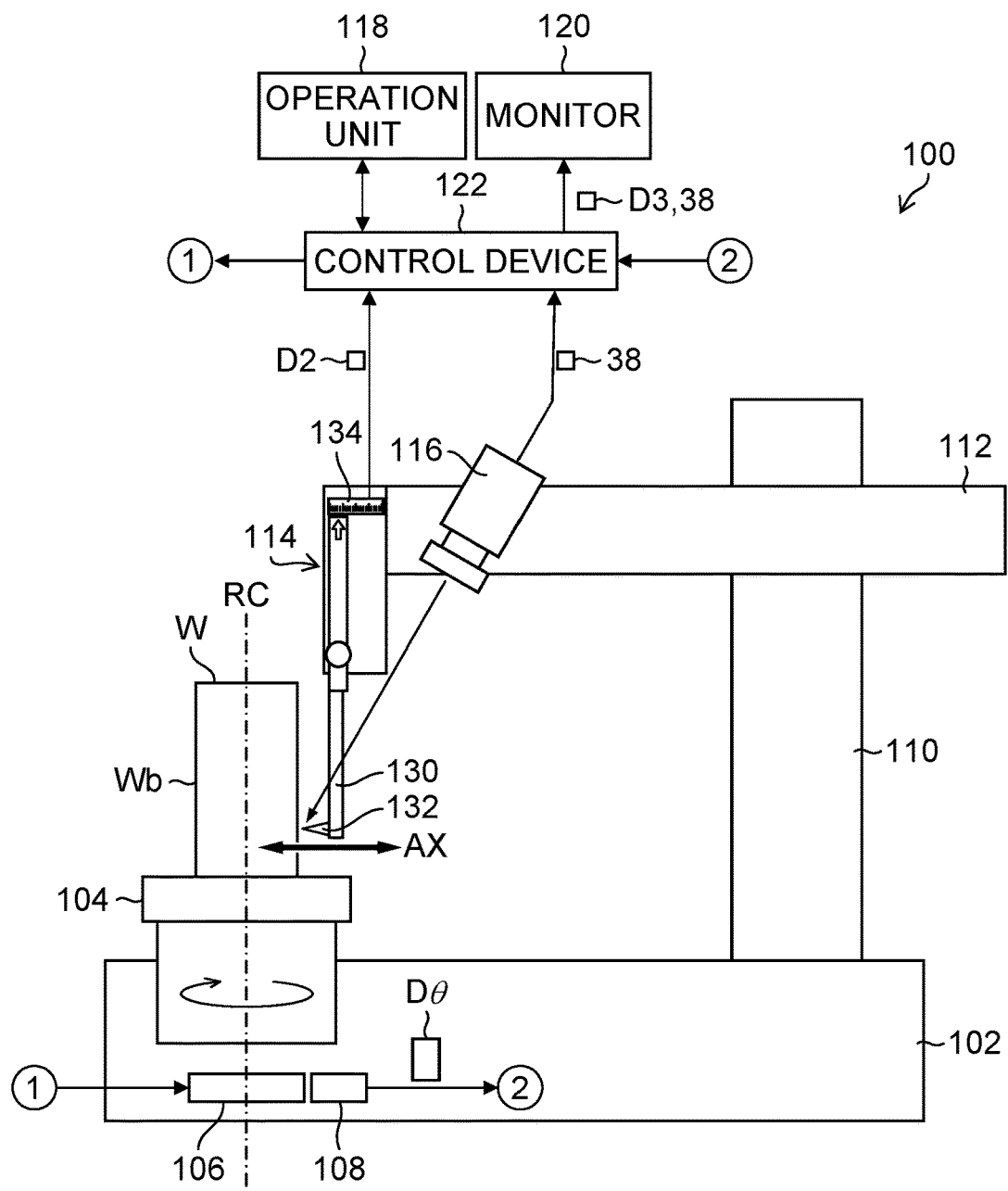
FIG. 19 schematically illustrates a roundness measurement device.

FIG. 19 schematically illustrates a roundness measurement device 100 corresponding to a shape measurement device of the presently disclosed subject matter. As illustrated in FIG. 19, the roundness measurement device 100 (including a cylindrical shape measurement device) measures the roundness of a peripheral surface Wb (an external peripheral surface and an internal peripheral surface) of the workpiece W having a solid cylindrical shape or a hollow cylindrical shape, using a contact 132. Note that the peripheral surface Wb corresponds to a surface to be measured.

The roundness measurement device 100 includes a measurement stage 102, a rotating table 104, a motor 106, a rotational angle detecting sensor 108, a column 110, a horizontal arm 112, a displacement detector 114, a camera 116, an operation unit 118, a monitor 120, and a control device 122.

The measurement stage 102 is a support stage (base stage) that supports each component of the roundness measurement device 100. The rotating table 104 and the column 110 are provided on the upper surface of the measurement stage 102. The motor 106 and the rotational angle detecting sensor 108 are provided in the measurement stage 102.

The workpiece W is mounted on the upper surface of the rotating table 104. The rotating table 104 is provided rotatably on the measurement stage 102 centered at the rotation center RC (rotation axis) in parallel with the Z direction.

The motor 106 corresponding to a relative movement mechanism of the presently disclosed subject matter rotates the rotating table 104 centered at the rotation center RC under control of the control device 122 described later. By rotating the rotating table 104 as described above, the displacement detector 114 (contact 132) can be relatively moved along the circumferential direction with respect to the peripheral surface Wb (hereinafter, the workpiece circumferential direction).

The rotational angle detecting sensor 108 corresponds to a position detecting sensor of the presently disclosed subject matter. For example, a rotary encoder is adopted. The rotational angle detecting sensor 108 detects the rotational angle of the rotating table 104, which can detect the relative position of the displacement detector 114 in the workpiece circumferential direction with respect to the peripheral surface Wb. The rotational angle detecting sensor 108 then outputs a rotational angle detection result Dθ of the rotating table 104 to the control device 122.

The column 110 is provided on the upper surface of the measurement stage 102 at a position shifted in the X direction from the rotating table 104, and has a shape extending in the Z direction. The column 110 holds the horizontal arm 112 freely movably in the Z direction and the X direction via a carriage, not illustrated. The displacement detector 114 is attached to the distal end portion of the horizontal arm 112.

The displacement detector 114 includes an arm 130, the contact 132, and a displacement detecting sensor 134. The arm 130 is freely swingably supported on a pivot in parallel with the Y direction at the displacement detector 114.

The contact 132 is provided at the distal end portion of the arm 130, and comes into contact with the peripheral surface Wb. The arm 130 is swung, which allows the contact 132 in this embodiment to be displaced in the X direction as indicated by an arrow AX in the diagram. The rotating table 104 and the workpiece W are relatively rotated by the motor 106 with respect to the displacement detector 114, thereby allowing the contact 132 to trace (scan) the peripheral surface Wb along the workpiece circumferential direction.

The displacement detecting sensor 134 is, for example, a linear variable differential transformer similar to the displacement detecting sensor 36 in each embodiment described above, or a scale-type sensor, and detects the displacement of the contact 132 in the X direction and outputs the displacement detection result D2 to the control device 122.

The camera 116 is provided at the horizontal arm 112, sequentially images (takes a moving image of) the distal end portion of the contact 132, and consecutively outputs the captured image 38 of the contact 132 to the control device 122.

For example, a keyboard, a mouse, an operation panel, operation buttons or the like is adopted as the operation unit 118, which accepts input of various operations by the operator.

Any of various displays, such as a publicly known liquid crystal display, may be adopted as the monitor 120. The monitor 120 displays the displacement detection signal D3 that is a result of measuring the shape of the peripheral surface Wb, the captured image 38 by the camera 116, various setting screens, various operation screens and the like.

The control device 122 integrally controls the operation of each unit of the roundness measurement device 100. The control device 122 has the configuration basically identical to that of the control device 28 of each embodiment described above, and synchronizes the three actions that include detection by the rotational angle detecting sensor 108, detection by the displacement detecting sensor 134, and imaging by the camera 116 together. Furthermore, every time the three actions in synchronization together are executed, the control device 28 causes the data storage 50 (see FIG. 2) to store the rotational angle detection result Dθ detected by the rotational angle detecting sensor 108, the displacement detection result D2 of the contact 132 detected by the displacement detecting sensor 134, and the captured image 38 taken by the camera 116, in an associated manner.

The control device 122 generates the displacement of the contact 132 in the X direction with respect to each rotational angle position of the rotating table 104, i.e., the displacement detection signal D3 indicating the surface shape (roundness) of the peripheral surface Wb, and causes the monitor 120 to display the signal. Furthermore, when the designation operation of designating any designated position SP in the displacement detection signal D3 displayed on the monitor 120 is performed through the operation unit 118, the control device 122 causes the monitor 120 to display the captured image 38 corresponding to the designated position SP.

As described above, the roundness measurement device 100 in the fifth embodiment also repetitively executes the three actions in synchronization together. Accordingly, every time the three actions are executed, the rotational angle detection result Dθ, the displacement detection result D2, and the captured image 38 can be stored in the saved data 51 in an associated manner. As a result, advantageous effects similar to those in each embodiment described are achieved. Similar to the second embodiment described above, the displacement detection signals D3 before and after the low-pass filtering may be displayed on the monitor 120. Furthermore, similar to the third and fourth embodiments described above, presence or absence of abnormality in the shape measurement of the peripheral surface Wb may be determined, and when abnormality is present, remeasurement, notification, warning display and the like may be executed.

Figure 20:
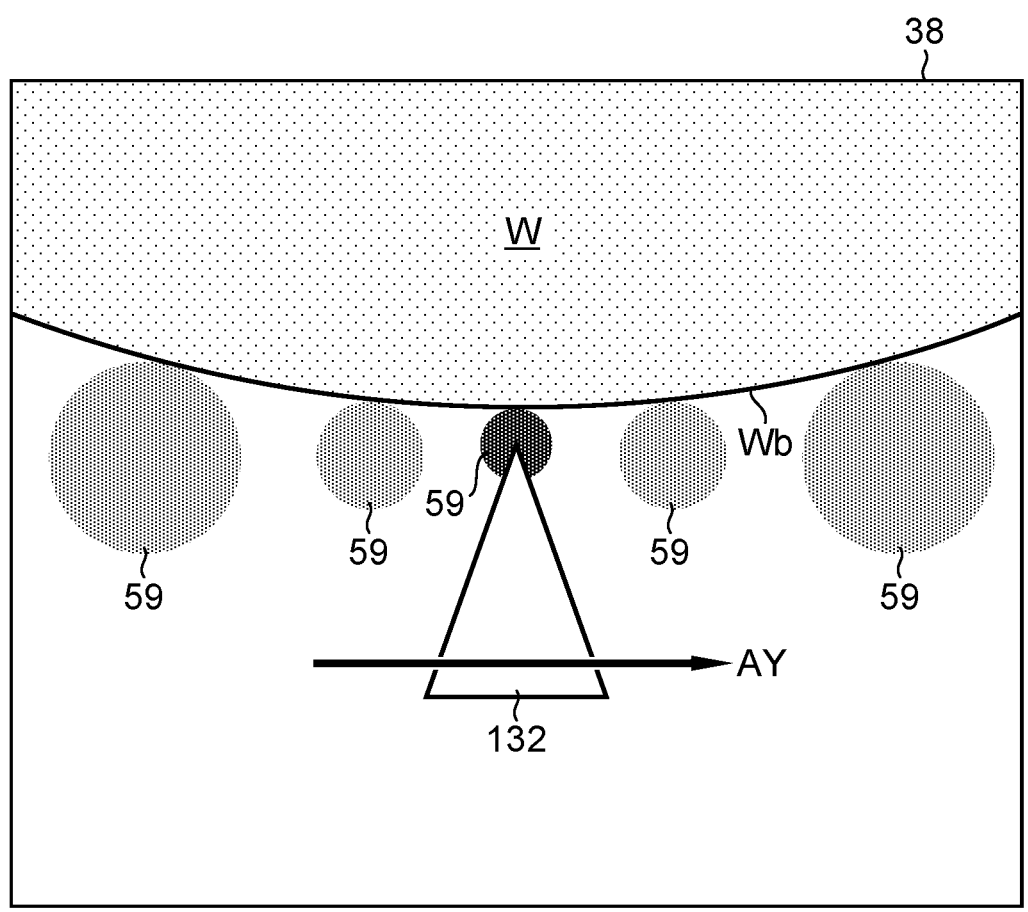
FIG. 20 is a diagram for illustrating advantageous effects achieved by a camera imaging the contact during rotation of a rotating table and a workpiece.

FIG. 20 is a diagram for illustrating advantageous effects achieved by the camera 116 imaging the contact 132 during rotation of the rotating table 104 and the workpiece W. As illustrated in FIG. 20, if the foreign matter 59 adheres to the peripheral surface Wb, the image of the foreign matter 59 moves along the direction indicated by an arrow AY in each captured image 38 taken with respect to each rotational angle of the rotating table 104 and the like. At this time, the image of the foreign matter 59 comes into focus at a position of being in contact with the contact 132, and conversely goes out of focus at positions deviated in the lateral direction (Y direction) from the contact 132. The amount of blurring of the image of the foreign matter 59 is an equivalent amount of blurring at a corresponding lateral position with reference to the contact 132. Consequently, based on the size (amount of blurring) of the image of the foreign matter 59 in each captured image 38, the position (rotational angle) where the contact 132 exceeds the foreign matter 59 can be determined.

MODIFIED EXAMPLE

According to the embodiments described above, every time the three actions are executed, the saved data 51 where the X-direction position detection result D1, the displacement detection result D2 and the captured image 38 are associated together is repetitively stored in the data storage 50. However, the presently disclosed subject matter is not limited thereto. For example, the saved data 51 obtained every time the three actions are executed is temporarily stored in the buffer memory (e.g., a ring buffer memory or the like). Only part of the saved data 51 temporarily stored in the buffer memory (e.g., only saved data items 51 determined to have abnormality by the abnormality determining unit 62) may be selectively stored in the data storage 50.

Modified Example 1

Figure 21:
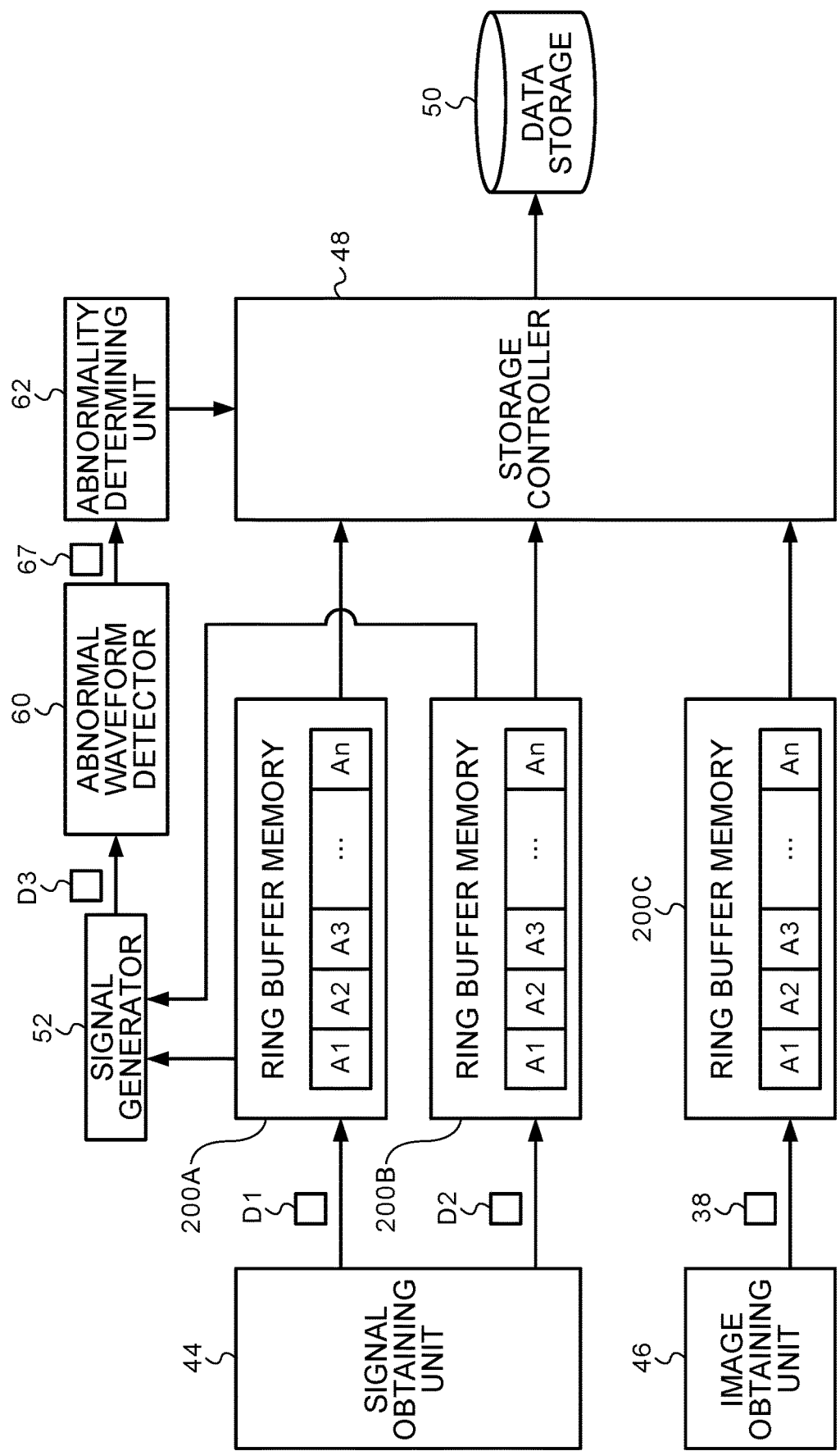
FIG. 21 is a block diagram illustrating a modified example of a surface shape measurement device according to the third embodiment.

FIG. 21 is a block diagram illustrating a modified example of the surface shape measurement device according to the third embodiment of the presently disclosed subject matter. FIG. 21 illustrates only what relates to storage control among configuration elements of the surface shape measurement device 10. In the following description, only what relates to storage control is described, and the description of the other components is omitted.

As illustrated in FIG. 21, the surface shape measurement device 10 according to a modified example 1 includes ring buffer memories 200A to 200C.

The ring buffer memories 200A to 200C correspond to buffer memories that are configuration elements of the storage unit of the presently disclosed subject matter, and are storage media (memories, stages, etc.) capable of storing data in what is called a ring buffer form.

The ring buffer memories 200A to 200C include n (n>1) save regions A1 to An.

Every time the three actions are executed, the signal obtaining unit 44 sequentially stores the X-direction position detection result D1 and the displacement detection result D2 obtained from the position detecting sensor 18 and the displacement detecting sensor 36, in the save regions A1 to An of the ring buffer memories 200A and 200B.

Every time the three actions are executed, the image obtaining unit 46 sequentially stores the captured image 38 obtained from the camera 22, in the save regions A1 to An of the ring buffer memory 200C.

After data items (D1, D2 and 38) are stored in the save region An in the ring buffer memories 200A to 200C, the subsequently obtained data items (D1, D2 and 38) are stored in the save region A1 (overwritten and stored).

As described above, data items in the latest certain time period among data items (D1, D2 and 38) obtained every time the three actions are executed are stored in the ring buffer memories 200A to 200C.

The signal generator 52 refers to the X-direction position detection result D1 and the displacement detection result D2 temporarily stored in the ring buffer memories 200A and 200B, and generates the displacement of the contact 34 in the Z direction with respect to each X-direction position of the displacement detector 20 (contact 34), i.e., the displacement detection signal D3 indicating the surface shape of the surface Wa.

The abnormal waveform detector 60 detects the abnormal waveform ER from the waveform of the displacement detection signal D3 generated by the signal generator 52. When the abnormal waveform detector 60 determines that occurrence of the abnormal waveform ER is present, this unit outputs the range information 67 (first range) indicating the X-direction position range of the abnormal waveform ER, to the abnormality determining unit 62 (see FIG. 11).

Based on the range information 67 input from the abnormal waveform detector 60, the abnormality determining unit (first abnormality determining unit) 62 obtains, from the ring buffer memory 200C, the captured image 38 corresponding to the X-direction position (range) of the displacement detector 20 indicated by the range information 67, i.e., the captured image 38 corresponding to the position of occurrence of the abnormal waveform ER, and applies image analysis to the image. When the abnormality determining unit 62 determines that abnormality in the shape measurement of the surface Wa is present, this unit then refers to the ring buffer memories 200A to 200C and generates the range information 67 indicating the range of the X-direction position of the displacement detector 20 corresponding to the captured image 38 determined to have abnormality in the shape measurement, and outputs the information to the storage controller 48.

The storage controller 48 stores, in the data storage 50, the saved data 51 where the X-direction position detection result D1, the displacement detection result D2 and the captured image 38 corresponding to the range information 67 among the data items temporarily stored in the ring buffer memories 200A to 200C are associated together.

According to the modified example 1, when the cause of abnormality of shape measurement of the measurement object is detected, the saved data 51 stored in the data storage 50 can be minimized. Accordingly, the cost of the surface shape measurement device 10 can be reduced.

Modified Example 2

Figure 22:
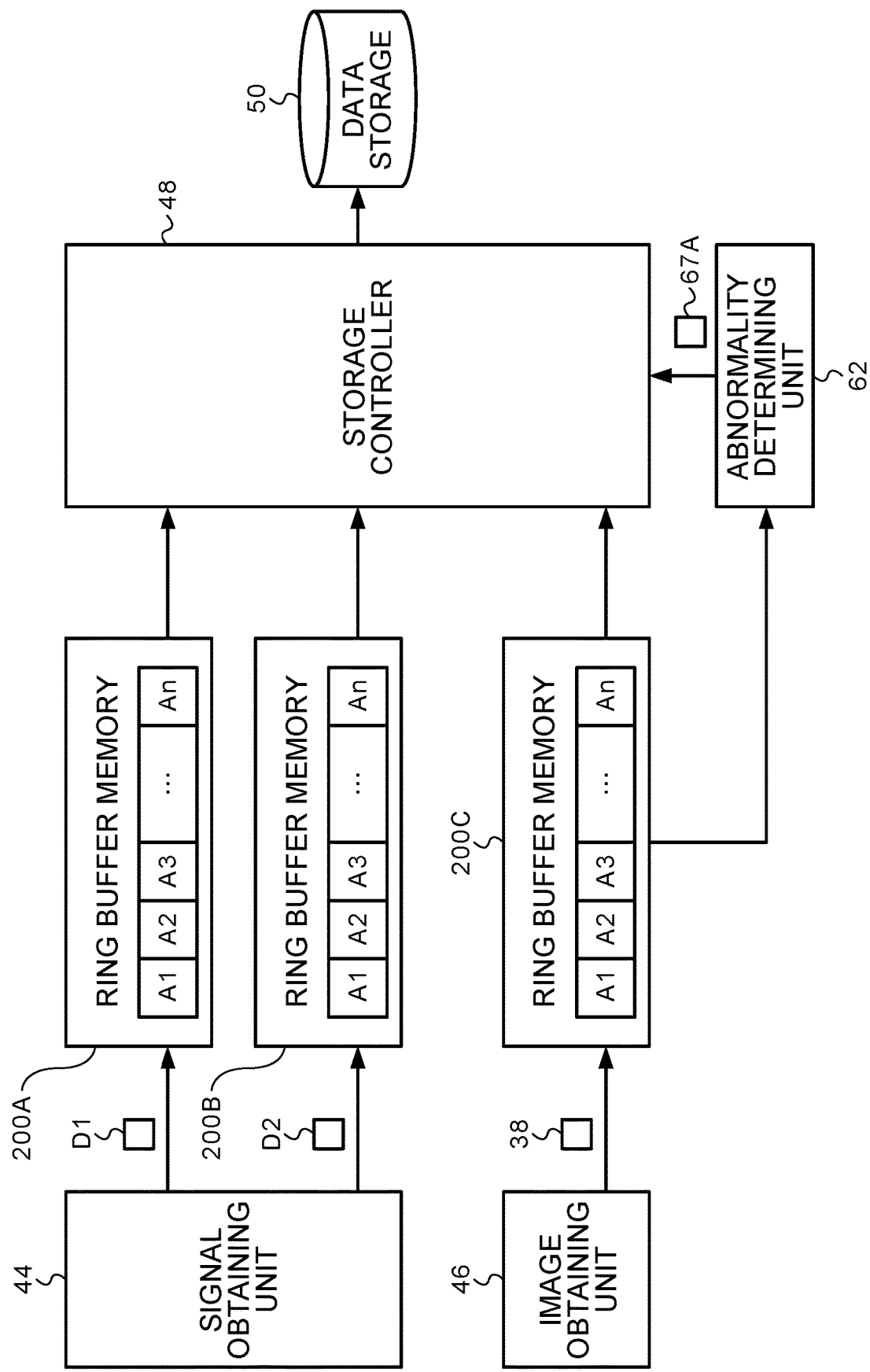
FIG. 22 is a block diagram illustrating a modified example of a surface shape measurement device according to the fourth embodiment.

FIG. 22 is a block diagram illustrating a modified example of the surface shape measurement device according to the fourth embodiment of the presently disclosed subject matter. FIG. 22 illustrates only what relates to storage control among configuration elements of the surface shape measurement device 10. In the following description, only what relates to storage control is described, and the description of the other components is omitted.

As illustrated in FIG. 22, similar to the modified example 1, the surface shape measurement device 10 according to a modified example 2 includes the ring buffer memories 200A to 200C. The X-direction position detection result D1, the displacement detection result D2, and the captured image 38 are temporarily stored in the ring buffer memories 200A to 200C.

The abnormality determining unit (second abnormality determining unit) 62 applies image analysis to the captured image 38 temporarily stored in the ring buffer memory 200C. When the abnormality determining unit 62 determines that abnormality in the shape measurement of the surface Wa is present, this unit refers to the ring buffer memories 200A to 200C, generates the range information 67A (second range) indicating the range of the X-direction position of the displacement detector 20 corresponding to the captured image 38 determined to have abnormality in the shape measurement, and outputs the information to the storage controller 48.

The storage controller 48 stores, in the data storage 50, the saved data 51 where the X-direction position detection result D1, the displacement detection result D2 and the captured image 38 corresponding to the range information 67A among the data items temporarily stored in the ring buffer memories 200A to 200C are associated together.

According to the modified example 2, when the cause of abnormality of shape measurement of the measurement object is detected, the saved data 51 stored in the data storage 50 can be minimized. Accordingly, the cost of the surface shape measurement device 10 can be reduced.

[Others]

In each embodiment described above, the data storage 50 is internally included in the control device 28. The data storage 50 may be provided separately from the surface shape measurement device 10 (e.g., an external server or a database).

According to the first to fourth embodiments described above, the displacement detector 20 is moved in the X direction during shape measurement of the surface Wa by the surface shape measurement device 10. Alternatively, the measurement stage 12 and the workpiece W may be moved in the X direction. That is, only if the displacement detector 20 and the workpiece W can be relatively moved in the X direction, the moving method is not specifically limited. Instead of rotating the workpiece W in the fifth embodiment, the displacement detector 114 may be rotated centered at the rotation center RC.

In each embodiment described above, the XY plane is in parallel with a horizontal plane, but may be non-parallel with the horizontal plane instead.

According to the first to fourth embodiments described above, the stationary type surface shape measurement device 10 is exemplified and described. The presently disclosed subject matter is also applicable to a handheld type surface shape measurement device 10.

In each embodiment described above, based on the synchronization signal CL output from the synchronization controller 42, detection by the position detecting sensor 18, detection by the displacement detecting sensor 36, and imaging by the camera 22 are synchronized together. Alternatively, any of the position detecting sensor 18, the displacement detecting sensor 36 and the camera 22 may be caused to function as the synchronization controller 42. In this case, operation timing of any of the position detecting sensor 18, the displacement detecting sensor 36 and the camera 22 is adopted as the synchronization signal CL (trigger), according to which the remaining two components are operated.

In each embodiment described above, the surface shape measurement device 10 and the roundness measurement device 100 are exemplified and described. The presently disclosed subject matter is also applicable to various shape measurement devices that perform shape measurement of a workpiece or any of various surfaces to be measured by using a contact in contact with the workpiece (measurement object).

REFERENCE SIGNS LIST

10: Surface shape measurement device; 12: Measurement stage; 14: Column; 16: Detector moving mechanism; 17: Holder; 18: Position detecting sensor; 18a: Linear scale; 18b: Reading head; 20: Displacement detector; 22: Camera; 25: Operation unit; 27: Monitor; 28: Control device; 30: Swing pivot; 32: Arm; 32a: Arm distal end portion; 32b: Arm proximal end portion; 34: Contact; 36: Displacement detecting sensor; 38: Captured image; 40: Drive controller; 42: Synchronization controller; 44: Signal obtaining unit; 46: Image obtaining unit; 48: Storage controller; 50: Data storage; 51: Saved data; 52: Signal generator; 54: Low-pass filter; 56: Display controller; 59: Foreign matter; 60: Abnormal waveform detector; 62: Abnormality determining unit; 64: Remeasurement controller; 66: Notification controller; 67: Range information; 67A: Range information; 68: Warning information; 69: Abnormality detailed information; 70: Warning information; 100: Roundness measurement device; 102: Measurement stage; 104: Rotating table; 106: Motor; 108: Rotational angle detecting sensor; 110: Column; 112: Horizontal arm; 114: Displacement detector; 116: Camera; 118: Operation unit; 120: Monitor; 122: Control device; 130: Arm; 132: Contact; 134: Displacement detecting sensor; 200A: Ring buffer memory; 200B: Ring buffer memory; 200C: Ring buffer memory; C1: Designated position changing operation; CL: Synchronization signal; Cu: Cursor; D1: X-direction position detection result; D2: Displacement detection result; D3: Displacement detection signal; Dθ: Rotational angle detection result; ER: Abnormal waveform; ET: Abnormality determination threshold; MA: Moving average line; NR: Normal range; RC: Rotation center; SP: Designated position; W: Workpiece; WR: Waveform region; Wa: Surface; and Wb: Peripheral surface

What is claimed is:

1. A shape measurement device for shape measurement of a measurement object by using a contact that is brought into contact with the measurement object, the shape measurement device comprising:

a displacement detector configured to detect displacement of the contact;

a relative movement mechanism configured to relatively move the displacement detector with respect to the measurement object, and allow the contact to trace a surface to be measured of the measurement object;

a position detecting sensor configured to detect a relative position of the displacement detector with respect to the measurement object;

a camera configured to image the contact, and output a captured image of the contact;

a synchronization controller configured to repetitively execute three actions in synchronization together while the relative movement is being performed by the relative movement mechanism, the actions including detection of the relative position by the position detecting sensor, detection of the displacement by the displacement detector, and imaging by the camera;

a storage controller configured to store the relative position detected by the position detecting sensor, the displacement of the contact detected by the displacement detector, and the captured image taken by the camera, in an associated manner, in a storage unit, every time the three actions are executed in synchronization together;

a signal generator configured to generate a displacement detection signal indicating the displacement of the contact at each relative position;

a display controller configured to cause a monitor to display the displacement detection signal generated by the signal generator; and an operation unit configured to accept a designation operation of designating any designated position in the displacement detection signal displayed on the monitor,
wherein the display controller obtains, from the storage unit, the captured image corresponding to the designated position designated by the designation operation to the operation unit, and causes the monitor to display the captured image.

2. The shape measurement device according to claim 1, wherein the synchronization controller outputs a synchronization signal for synchronizing the three actions, to the position detecting sensor, the displacement detector and the camera.

3. The shape measurement device according to claim 1, wherein every time the designated position is changed, the display controller repetitively executes obtainment of the captured image from the storage unit, and displaying of the captured image on the monitor.

4. The shape measurement device according to claim 1, further comprising a low-pass filter configured to apply low-pass filtering to the displacement detection signal generated by the signal generator,
wherein the display controller has a superimposed display mode for causing the monitor to display the displacement detection signals before and after the low-pass filtering.

5. The shape measurement device according to claim 1, further comprising:
a signal generator configured to generate a displacement detection signal indicating the displacement of the contact at each relative position;
an abnormal waveform detector configured to detect an abnormal waveform where a waveform of the displacement detection signal is abnormal, from the displacement detection signal generated by the signal generator; and
a first abnormality determining unit configured to determine presence or absence of abnormality in the shape measurement, based on the captured image that is in the storage unit and corresponds to a first range, the first range being assumed as a range of the relative position where the abnormal waveform is detected by the abnormal waveform detector.

6. The shape measurement device according to claim 5, wherein the first abnormality determining unit determines presence or absence of abnormality in the shape measurement, based on presence or absence of an image of a foreign matter in the captured image.

7. The shape measurement device according to claim 5, further comprising
a remeasurement controller configured to execute remeasurement that drives the relative movement mechanism and retraces the surface to be measured by the contact,
wherein every time the first abnormality determining unit determines that abnormality is present, the remeasurement controller executes the remeasurement, and the signal generator generates the displacement detection signal, and the abnormal waveform detector detects the abnormal waveform, and the first abnormality determining unit determines presence or absence of abnormality in the shape measurement.

8. The shape measurement device according to claim 7, further comprising a notification unit configured to issue a notification about warning information when a number of remeasurements exceeds a predetermined certain number.

9. The shape measurement device according to claim 5, wherein the storage controller temporarily stores, in a buffer memory of the storage unit, data that includes the relative position detected by the position detecting sensor, the displacement of the contact detected by the displacement detector and the captured image taken by the camera, and stores, in a data storage of the storage unit, data determined to be abnormal by the first abnormality determining unit in the data temporarily stored in the buffer memory.

10. A shape measurement device for shape measurement of a measurement object by using a contact that is brought into contact with the measurement object, the shape measurement device comprising:
a displacement detector configured to detect displacement of the contact;
a relative movement mechanism configured to relatively move the displacement detector with respect to the measurement object, and allow the contact to trace a surface to be measured of the measurement object;
a position detecting sensor configured to detect a relative position of the displacement detector with respect to the measurement object;
a camera configured to image the contact, and output a captured image of the contact;
a synchronization controller configured to repetitively execute three actions in synchronization together while the relative movement is being performed by the relative movement mechanism, the actions including detection of the relative position by the position detecting sensor, detection of the displacement by the displacement detector, and imaging by the camera;
a storage controller configured to store the relative position detected by the position detecting sensor, the displacement of the contact detected by the displacement detector, and the captured image taken by the camera, in an associated manner, in a storage unit, every time the three actions are executed in synchronization together;
an abnormality determining unit configured to determine presence or absence of abnormality in the shape measurement, in each captured image stored in the storage unit;
a signal generator configured to generate a displacement detection signal indicating the displacement of the contact at each relative position; and
a display controller configured to cause a monitor to display the displacement detection signal generated by the signal generator,
wherein the display controller refers to the storage unit and detects a range that is a range of the relative position corresponding to the captured image determined to be abnormal by the abnormality determining unit, and causes the monitor to identifiably display a waveform region corresponding to the range of the relative position in the waveform of the displacement detection signal displayed on the monitor.

11. The shape measurement device according to claim 10, wherein the abnormality determining unit determines presence or absence of abnormality in the shape measurement, based on presence or absence of an image of a foreign matter in the captured image, with respect to each captured image stored in the storage unit.

12. The shape measurement device according to claim 10, further comprising a notification unit configured to issue a notification about warning information when the abnormality determining unit determines that abnormality is present.

13. The shape measurement device according to claim 10, wherein the storage controller temporarily stores, in a buffer memory of the storage unit, data that includes the relative position detected by the position detecting sensor, the displacement of the contact detected by the displacement detector and the captured image taken by the camera, and stores, in a data storage of the storage unit, data determined to be abnormal by the abnormality determining unit in the data temporarily stored in the buffer memory.

14. The shape measurement device according to claim 1, wherein the relative movement mechanism relatively moves the displacement detector in a horizontal direction with respect to the measurement object.

15. The shape measurement device according to claim 1, wherein the relative movement mechanism relatively rotates the measurement object and the displacement detector about a rotation center while the contact is in contact with a peripheral surface of the measurement object that has a solid cylindrical shape or a hollow cylindrical shape.

16. A method of controlling a shape measurement device that comprises a displacement detector that includes a contact in contact with a measurement object, and a relative movement mechanism configured to relatively move the displacement detector with respect to the measurement object, and allow the contact to trace a surface to be measured of the measurement object, and performs shape measurement of the measurement object by using the contact, the method comprising:
  a position detecting step of detecting a relative position of the displacement detector with respect to the measurement object;
  a displacement detecting step of detecting a displacement of the contact by the displacement detector;
  an imaging step of imaging the contact, and outputting a captured image of the contact;
  a synchronization control step of repetitively executing three actions in synchronization together while the relative movement is being performed by the relative movement mechanism, the actions including detection of the relative position in the position detecting step, detection of the displacement in the displacement detecting step, and imaging in the imaging step;
  a storage control step of storing the relative position detected in the position detecting step, the displacement of the contact detected by the displacement detector, and the captured image taken in the imaging step, in an associated manner, in a storage unit, every time the three actions are executed in synchronization together;
  a signal generating step of generating a displacement detection signal indicating the displacement of the contact at each relative position;
  a first display control step of causing a monitor to display the displacement detection signal generated in the signal generating step;
  an operating step of accepting a designation operation of designating any designated position in the displacement detection signal displayed on the monitor; and
  a second display control step of obtaining, from the storage unit, the captured image corresponding to the designated position designated by the designation operation in the operating step, and causing the monitor to display the captured image.

17. A method of controlling a shape measurement device that comprises a displacement detector that includes a contact in contact with a measurement object, and a relative movement mechanism configured to relatively move the displacement detector with respect to the measurement object, and allow the contact to trace a surface to be measured of the measurement object, and performs shape measurement of the measurement object by using the contact, the method comprising:
  a position detecting step of detecting a relative position of the displacement detector with respect to the measurement object;
  a displacement detecting step of detecting a displacement of the contact by the displacement detector;
  an imaging step of imaging the contact, and outputting a captured image of the contact;
  a synchronization control step of repetitively executing three actions in synchronization together while the relative movement is being performed by the relative movement mechanism, the actions including detection of the relative position in the position detecting step, detection of the displacement in the displacement detecting step, and imaging in the imaging step;
  a storage control step of storing the relative position detected in the position detecting step, the displacement of the contact detected by the displacement detector, and the captured image taken in the imaging step, in an associated manner, in a storage unit, every time the three actions are executed in synchronization together;
  an abnormality determining step of determining presence or absence of abnormality in the shape measurement, in each captured image stored in the storage unit;
  a signal generating step of generating a displacement detection signal indicating the displacement of the contact at each relative position;
  a first display control step of causing a monitor to display the displacement detection signal generated in the signal generating step; and
  a second display control step of referring to the storage unit and detecting a range that is a range of the relative position corresponding to the captured image determined to be abnormal in the abnormality determining step, and causing the monitor to identifiably display a waveform region corresponding to the range of the relative position in the waveform of the displacement detection signal displayed on the monitor.

* * * * *